(12) United States Patent
Saito

(10) Patent No.: US 10,382,641 B2
(45) Date of Patent: Aug. 13, 2019

(54) OPTICAL SCANNING DEVICE THAT DIRECTS HEAT AWAY FROM A DEFLECTOR AND IMAGE FORMING DEVICE INCLUDING SAME

(71) Applicant: Konica Minolta, Inc., Tokyo (JP)

(72) Inventor: Shinya Saito, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/959,733

(22) Filed: Apr. 23, 2018

(65) Prior Publication Data
US 2018/0324319 A1 Nov. 8, 2018

(30) Foreign Application Priority Data

May 8, 2017 (JP) .................................. 2017-092166

(51) Int. Cl.
| | |
|---|---|
| H04N 1/04 | (2006.01) |
| H04N 1/028 | (2006.01) |
| G03G 15/20 | (2006.01) |
| G03G 15/043 | (2006.01) |
| G03G 15/08 | (2006.01) |

(52) U.S. Cl.
CPC ....... H04N 1/0283 (2013.01); G03G 15/0435 (2013.01); G03G 15/0865 (2013.01); G03G 15/2064 (2013.01)

(58) Field of Classification Search
CPC ............. H04N 1/0283; G03G 15/0435; G03G 15/0865; G03G 15/2064
USPC ......................................... 358/1.1, 1.15, 475
See application file for complete search history.

(56) References Cited

U.S. PATENT DOCUMENTS

| | | | | |
|---|---|---|---|---|
| 2011/0182621 | A1* | 7/2011 | Hirakawa | .......... G02B 13/0005 399/151 |
| 2011/0222132 | A1* | 9/2011 | Yamashita | ............... B41J 2/473 358/474 |

FOREIGN PATENT DOCUMENTS

| | | |
|---|---|---|
| JP | 2007093638 A | 4/2007 |
| JP | 2008020589 A | 1/2008 |
| JP | 2011154253 A | 8/2011 |

* cited by examiner

*Primary Examiner* — Douglas Q Tran
(74) *Attorney, Agent, or Firm* — Lucas & Mercanti, LLP

(57) ABSTRACT

An optical scanning device that scans a target surface with light, includes: a light source; a deflector that deflects light of the light source; and an optical system that forms an image of light deflected, wherein the deflector includes: a polygon mirror that reflects and deflects light of the light source; a motor that rotates the polygon mirror; and a case body that airtightly houses the polygon mirror and the motor, the case body includes a cylindrical inner wall, and the inner wall includes a rectifier that guides, from one to the other of a first space and a second space, an air flow generated by rotation of the polygon mirror in a space surrounded by the inner wall, and the first space is located on the motor side with respect to the polygon mirror and the second space is located on an opposite side of the first space.

12 Claims, 17 Drawing Sheets

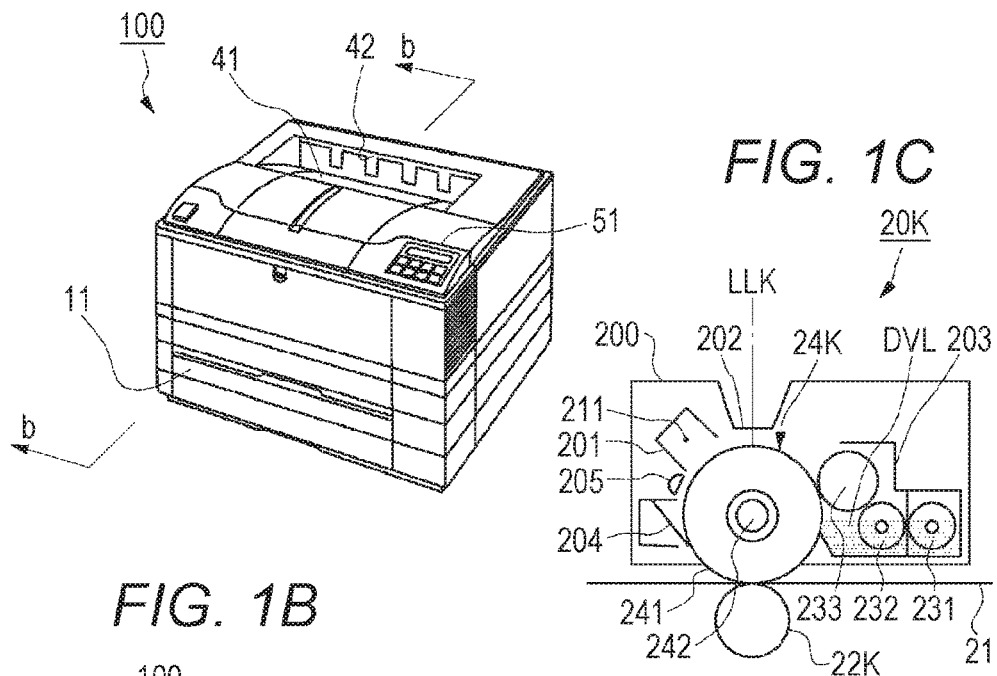
FIG. 1A
FIG. 1C
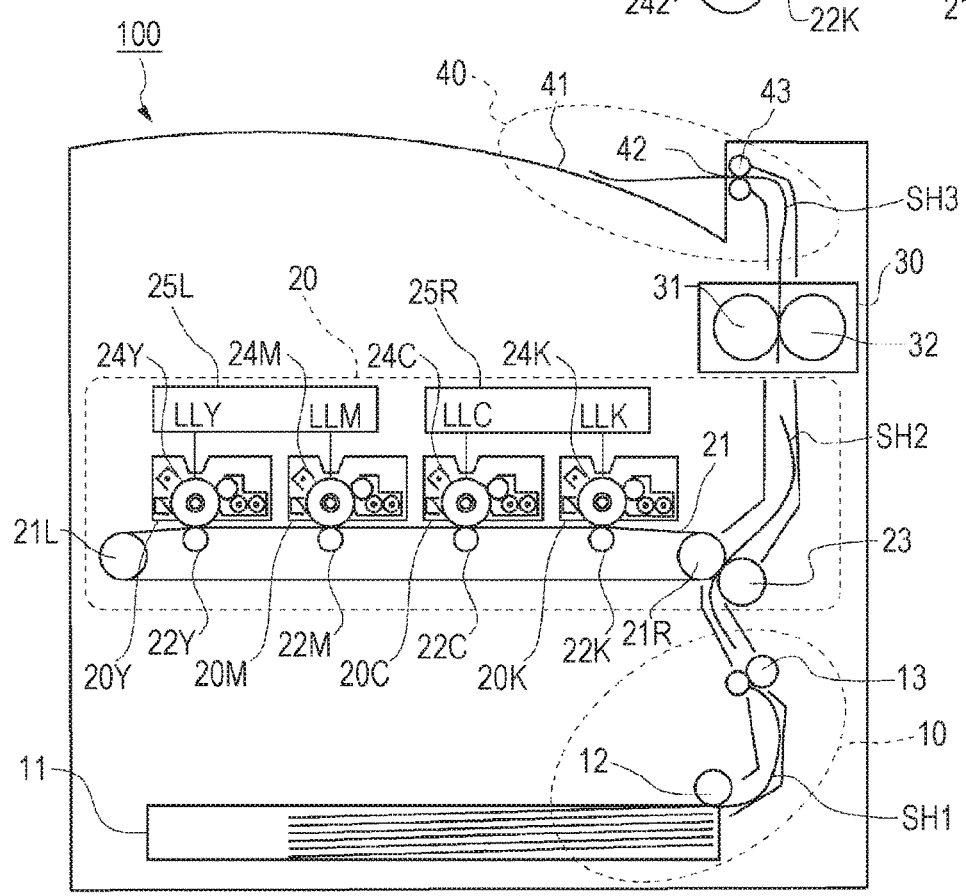
FIG. 1B

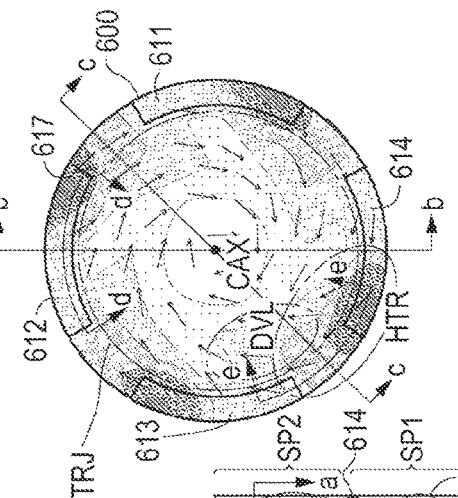
FIG. 7A
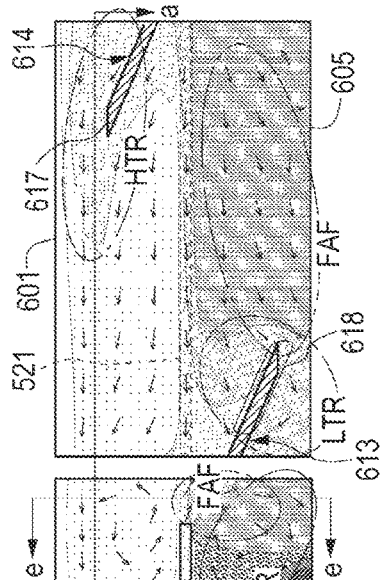
FIG. 7E
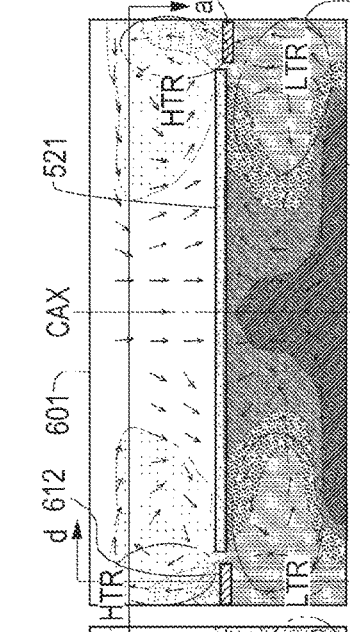
FIG. 7B
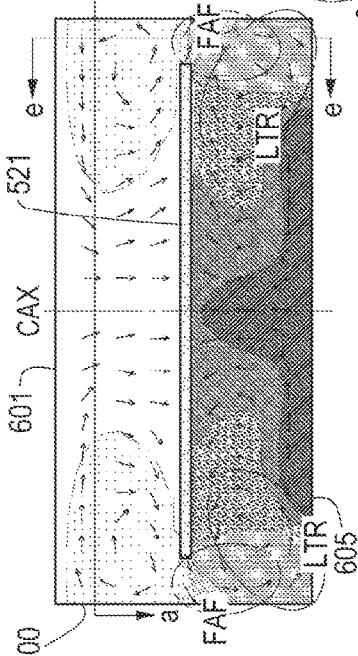
FIG. 7C
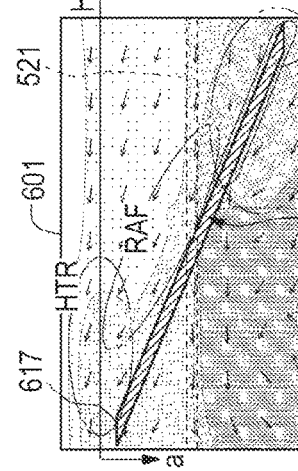
FIG. 7D
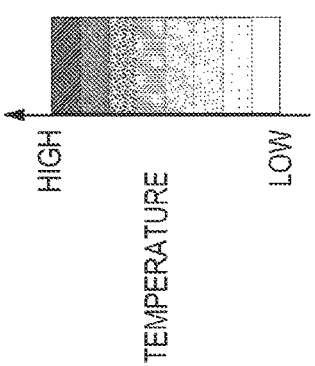

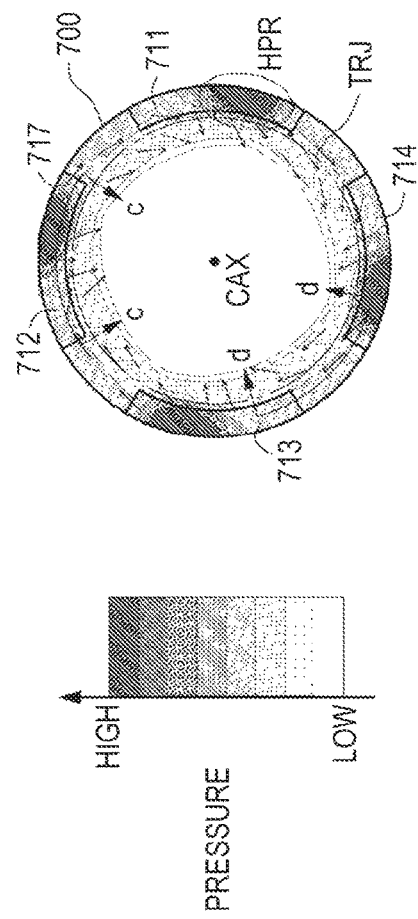
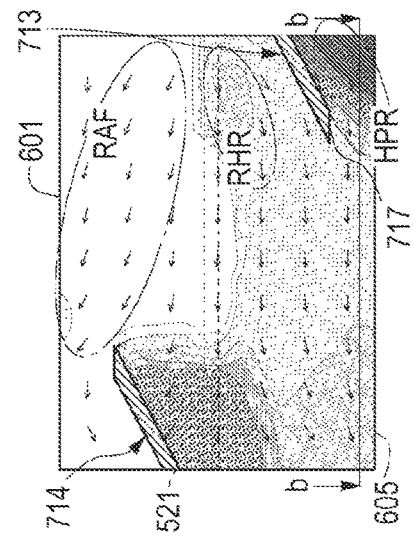
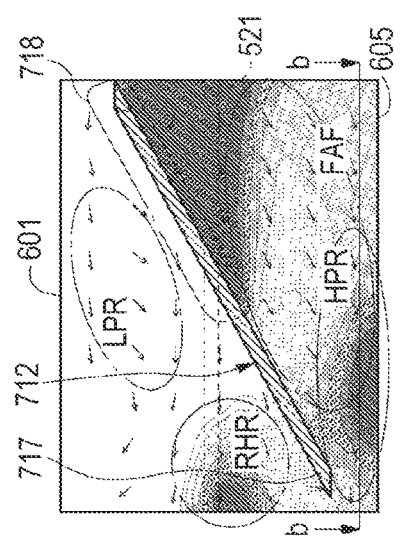
FIG. 8B
FIG. 8D
FIG. 8C

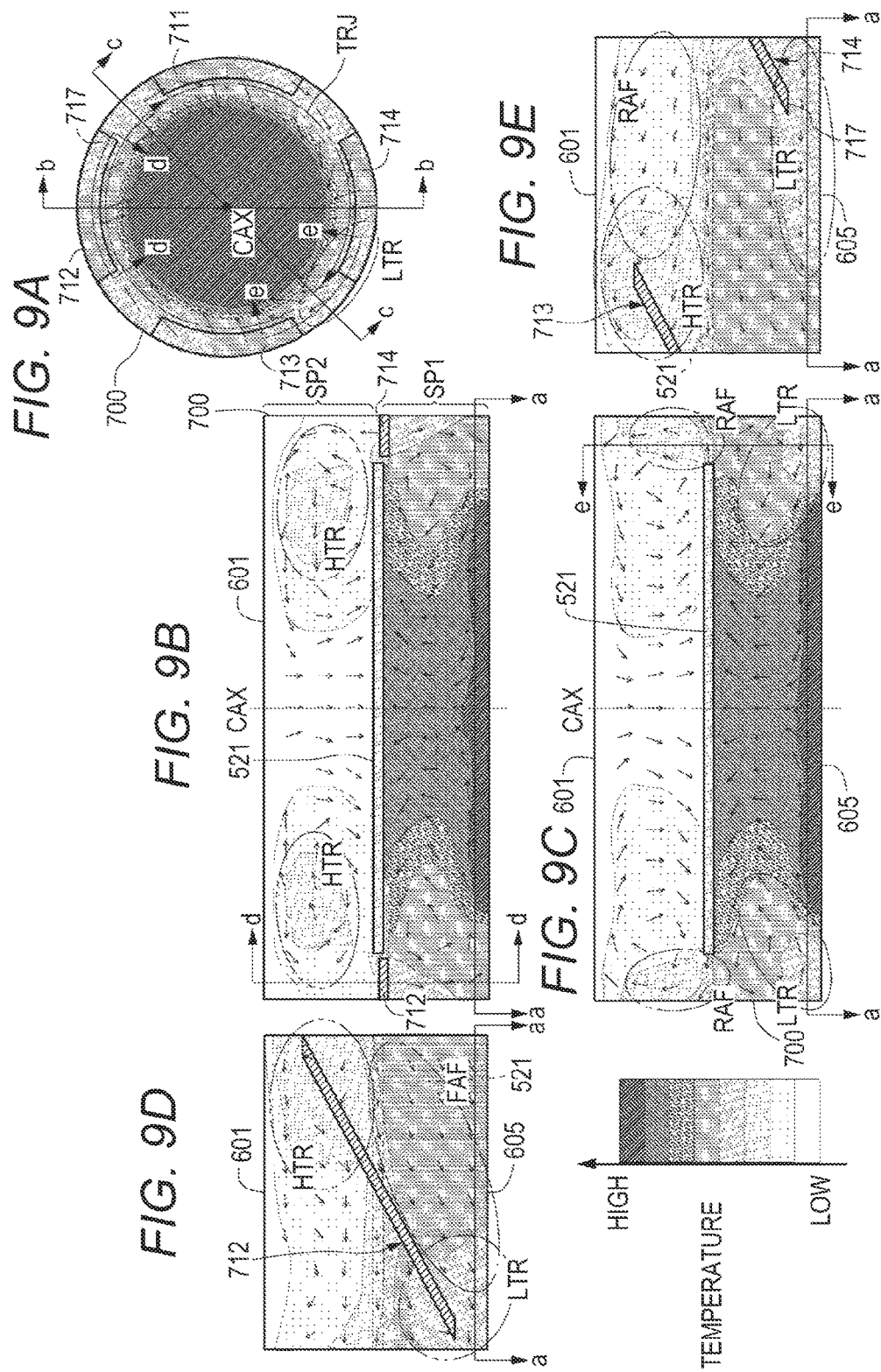

OPTICAL SCANNING DEVICE THAT DIRECTS HEAT AWAY FROM A DEFLECTOR AND IMAGE FORMING DEVICE INCLUDING SAME

The entire disclosure of Japanese patent Application No. 2017-092166, filed on May 8, 2017, is incorporated herein by reference in its entirety.

BACKGROUND

Technological Field

The present invention relates to an electrophotographic image forming device, and particularly relates to a heat exhausting structure of an optical scanning device that performs exposure scanning for a photoreceptor.

Description of the Related Art

An optical scanning device is also called "print head (PH)" and used to expose a surface of a photoreceptor in an electrophotographic image forming device such as a printer and a copying machine. More specifically, the optical scanning device includes a light source, a deflector, and an optical system. The light source irradiates the deflector with light modulated with image data. The deflector alternately reflects the modulated light at a plurality of deflection surfaces while rotating a built-in polygon mirror by using a motor (hereinafter referred to as "polygon motor"). With this operation, a deflection angle of the modulated light periodically is changed. An optical system forms an image of the deflected light on a uniformly-charged region of the surface of the photoreceptor. Since an image forming point is moved in one direction on the surface of the photoreceptor in accordance with change in the deflection angle change, the surface is linearly exposed. In this linear exposure region, distribution of charge amounts forms a pattern corresponding to image data in accordance to change in an exposure amount, in other words, one line of an electrostatic latent image is formed. The photoreceptor covers an outer peripheral surface of a rotary body such as a drum or a belt, and is rotated together with the rotary body during exposure. The optical scanning device repeats exposure of each line in synchronism with this rotation of the photoreceptor. As a result, the exposed lines are superimposed in a rotational direction on the surface of the photoreceptor, and the electrostatic latent image two-dimensionally spreads.

In recent years, further productivity improvement (number of print sheets per unit time) and further image quality improvement, particularly, image definition improvement are required in an image forming device. Due to such requirements, various attempts are made in an optical scanning device so as to further increase a scanning area, namely, a writing amount per unit time. As one of such attempts, increase of a rotation speed of a polygon mirror can be exemplified. However, increase of the rotation speed increases noise such as wind noise by the polygon mirror, and also increases current consumption by the polygon motor and a driving circuit thereof (hereinafter referred to as "polygon motor and the like"). As a countermeasure to overcome these disadvantages, there are known technologies in which, for example, an outer periphery of a polygon mirror is surrounded by an inner wall (refer to JP 2007-093638 A, JP 2008-020589 A, JP 2011-154253 A, for example). This inner wall stabilizes an air flow generated by rotation of the polygon mirror in the periphery thereof, and spatially and temporally minimizes occurrence of irregular disturbance, that is, turbulence. Since air resistance received by the polygon mirror is suppressed as a result thereof, wind noise is decreased and current consumption (windage loss) of the polygon motor is reduced.

As another disadvantage caused by increase in a rotation speed of a polygon mirror, increase in a heat generation amount of a polygon motor and the like caused by increase in current consumption can be exemplified. Particularly, in a case where an outer periphery of the polygon mirror is surrounded by an inner wall, a space surrounded by the inner wall tends to be filled with heat from the polygon motor and the like. When a deflection error caused by thermal deformation of the polygon mirror is excessive, optical characteristics in an entire optical scanning device may be changed beyond an allowable range. Since such an excessive change causes an excessive error to a position of an exposure region or an exposure amount on a surface of a photoreceptor, improvement of image quality may be hindered. Furthermore, since there is a high risk of overheating the polygon motor and the like, high reliability of the optical scanning device can be hardly maintained.

To prevent such malfunction, it is important to efficiently release heat generated from the polygon motor and the like to the outside of the deflector from the inner side of the inner wall. To achieve this, it is effective to secure a large gap between the outer periphery of the polygon mirror and the inner wall to improve passage of heat by convection. However, on the other hand, such a large gap tends to destabilize an air flow caused by rotation of the polygon mirror, and therefore, it may be difficult to sufficiently suppress a risk of turbulence.

SUMMARY

An object of the present invention is to provide an optical scanning device in which a risk of turbulence around a polygon mirror is kept sufficiently low and heat from a polygon motor and a driving circuit thereof can be efficiently released to the outside of a deflector even when a rotation speed of a polygon mirror is increased.

To achieve the abovementioned object, according to an aspect of the present invention, an optical scanning device that scans a target surface with light, reflecting one aspect of the present invention comprises: a light source; a deflector that deflects light of the light source; and an optical system that forms, on the target surface, an image of light deflected by the deflector, wherein the deflector includes: a polygon mirror that reflects and deflects light of the light source while being rotated; a motor that rotates the polygon mirror; and a case body that airtightly houses the polygon mirror and the motor, the case body includes a cylindrical inner wall surrounding an outer periphery of the polygon mirror, and the inner wall includes, on an inner surface, a rectifier that guides, from one to the other of a first space and a second space, an air flow generated by rotation of the polygon mirror in a space surrounded by the inner wall, and the first space is located on the motor side with respect to the polygon mirror and the second space is located on an opposite side of the first space.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 1A is a perspective view illustrating appearance of a printer according to an embodiment of the present invention;

FIG. 1B is a schematic cross-sectional view of the printer taken along a line b-b illustrated in FIG. 1A;

FIG. 1C is an enlarged view of one of photoreceptor units illustrated in FIG. 1B;

FIGS. 7A to 7E are diagrams illustrating distribution of directions and temperatures of air flows in the sealed space surrounded by the inner wall illustrated in FIGS. 5A and 5B;

FIGS. 8B to 8D are diagrams illustrating distribution of directions and pressures of air flows in a sealed space surrounded by the inner wall;

FIGS. 9A to 9E are diagrams illustrating distribution of directions and temperatures of air flows in the sealed space surrounded by the inner wall illustrated in FIG. 8A;

FIG. 13A is a schematic top view of the inner wall illustrated in FIGS. 12A and 12B;

FIGS. 13B and 13C are vertical cross-sectional views illustrating distribution of directions and temperatures of air flows in a sealed space surrounded by the inner wall;

FIGS. 13D and 13E are vertical cross-sectional views illustrating distribution of directions and pressures of air flows in the same sealed space.

DETAILED DESCRIPTION OF EMBODIMENTS

Figure 2A:
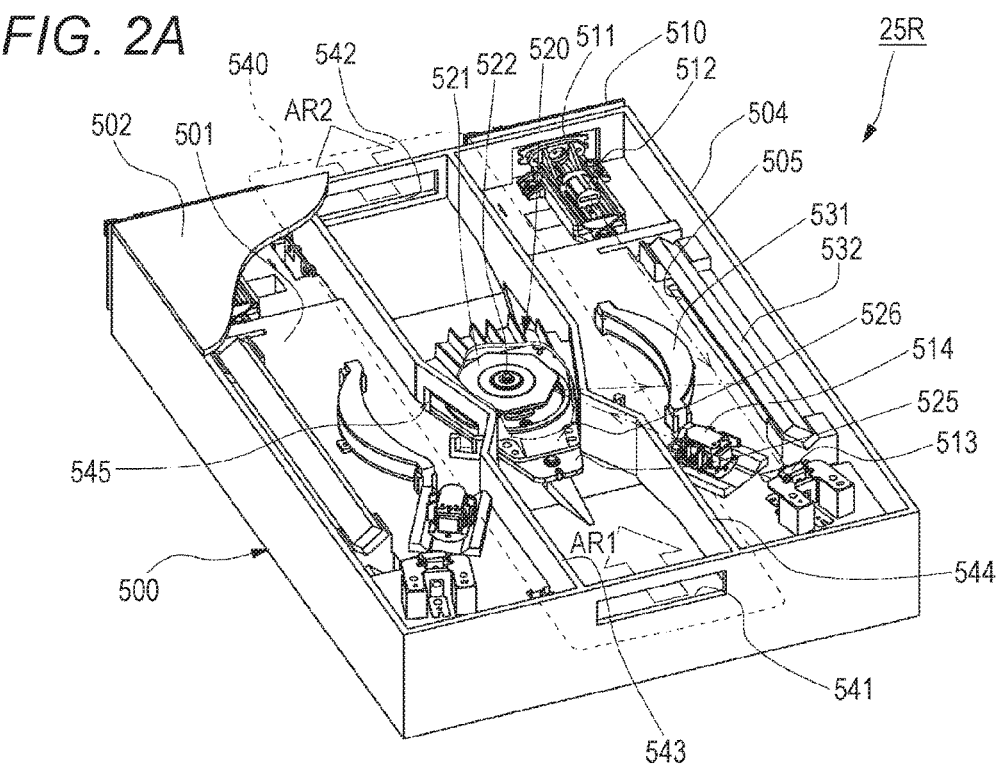
FIGS. 2A and 2B are perspective views illustrating appearance of an optical scanning device illustrated in FIG. 1B from different viewpoints.

Hereinafter, one or more embodiments of the present invention will be described with reference to the drawings. However, the scope of the invention is not limited to the disclosed embodiments.

[Appearance of Image Forming Device]

FIG. 1A is a perspective view illustrating appearance of an image forming device 100 according to an embodiment of the present invention. This image forming device 100 is a printer. A sheet ejection tray 41 is provided on an upper surface of a case body of the image forming device, and stores a sheet ejected from a sheet ejection port 42 opened at a deep side of the sheet ejection tray. An operation panel 51 is embedded in front of the sheet ejection tray 41. A sheet feeding cassette 11 is fitted to a bottom of the printer 100 in a drawable manner.

[Internal Structure of Image Forming Device]

FIG. 1B is a schematic cross-sectional view of the printer 100 taken along a line b-b illustrated in FIG. 1A. The printer 100 is an electrophotographic color printer, and includes a sheet feeding unit 10, an image forming unit 20, a fixing unit 30, and a sheet ejection unit 40.

First, the sheet feeding unit 10 separates sheets SH1 one by one from a bundle of sheets stored in the sheet feeding cassette 11 by using a pickup roller 12. The sheet feeding unit 10 feeds a sheet thus separated to the image forming unit 20 by using a timing roller 13. The term "sheet" represents a thin film-like or thin plate-like material, article, or a printed matter made of a paper or a resin. Sheet types, namely, paper types that can be stored in the sheet feeding cassette 11 are, for example, a plain paper, a fine quality paper, a color paper, or a coated paper, and a size thereof is, for example, A3, A4, A5 or B4. Furthermore, a sheet orientation can be set in any one of longitudinal arrangement and lateral arrangement.

The image forming unit 20 is, for example, an intermediate transfer system, and includes photoreceptor units 20Y, 20M, 20C, 20K, an intermediate transfer belt 21, primary transfer rollers 22Y, 22M, 22C, 22K, a secondary transfer roller 23, and optical scanning devices 25L, 25R. The intermediate transfer belt 21 is stretched between a driven pulley 21L and a drive pulley 21R in a rotatable manner. The four photoreceptor units 20Y to 20K and four primary transfer rollers 22Y to 22K are arranged in a manner paired one-to-one between the pulleys 21L and 21R, and paired photoreceptor unit and primary transfer roller faces each other interposing the intermediate transfer belt 21 (tandem arrangement). The secondary transfer roller 23 forms a nip with the drive pulley 21R interposing the intermediate transfer belt 21 therebetween. A sheet SH2 fed from the timing roller 13 is made to pass through this nip. All of photoreceptor drums 24Y, 24M, 24C, 24K included in the photoreceptor units 20Y to 20K, the intermediate transfer belt 21, the driven pulley 21L, the drive pulley 21R, the primary transfer rollers 22Y to 22K, and the secondary transfer roller 23 have rotation axes parallel to each other. Such a common axial direction (normal direction of a paper surface in FIG. 1B) will be referred to as "main scanning direction" in the following. For example, each of the optical scanning devices 25L and 25R irradiates the two photoreceptor units ((20Y, 20M) or (20C, 20K)) with laser light modulated with image data.

In the photoreceptor units 20Y to 20K, the photoreceptor drums 24Y to 24K form nips by contacting the facing primary transfer rollers 22Y to 22K while interposing the intermediate transfer belt 21. In the photoreceptor units 20Y to 20K, while the intermediate transfer belt 21 is rotated (anticlockwise in FIG. 1B), when a same surface portion thereof passes through each of the nips between the primary transfer rollers 22Y to 22K and the photoreceptor drums 24Y to 24K, a toner image of one different color out of yellow (Y), magenta (M), cyan (C), and black (K) is formed on this surface portion. The toner images of four colors are superimposed on the surface portion, and one color toner image is formed. Synchronized with the timing when the color toner image passes through a nip between the drive pulley 21R and the secondary transfer roller 23, the sheet SH2 is made to pass through the nip from the timing roller 13. Consequently, the color toner image is transferred to the sheet SH2 from the intermediate transfer belt 21.

The fixing unit 30 thermally fixes the toner image onto a sheet SH3 fed from the image forming unit 20. More specifically, the fixing unit 30 makes the sheet SH2 pass through a nip between a fixing roller 31 and a pressure roller 32 while rotating these rollers. At this point, the fixing roller 31 applies heat of a built-in heater to a surface of the sheet SH3, and the pressure roller 32 applies pressure to a heated portion of the sheet SH3 to press the sheet against the fixing roller 31. A toner image is fixed onto the surface of the sheet SH3 by the heat from the fixing roller 31 and the pressure from the pressure roller 32. The fixing unit 30 further feeds the sheet SH3 to the sheet ejection unit 40 by rotation of the fixing roller 31 and the pressure roller 32.

The sheet ejection unit 40 ejects, from the sheet ejection port 42 to the sheet ejection tray 41, the sheet SH3 onto which the toner image has been fixed. More specifically, using a sheet ejection roller 43 disposed inside the sheet ejection port 42, the sheet ejection unit 40 ejects, to the outside of the sheet ejection port 42, the sheet SH3 that has been moved to the sheet ejection port 42 from the upper portion of the fixing unit 30, and then places the sheet on the sheet ejection tray 41.

[Structure of Photoreceptor Unit and Image Forming Processing By Photoreceptor Unit]

FIG. 1C is an enlarged view of one of the photoreceptor units, namely, the photoreceptor unit 20K illustrated in FIG. 1B. The photoreceptor unit 20K includes a charging unit 201, an exposing unit 202, a developing unit 203, a cleaning blade 204, and an eraser 205 in addition to the photoreceptor drum 24K. These functional units 201 to 205 are housed together with the photoreceptor drum 24K inside a case body 200 of the photoreceptor unit 20K, and arranged in a manner surrounding the photoreceptor drum 22. The functional units 201 to 205 perform, for an outer peripheral surface 241 of the photoreceptor drum 24K, processing other than fixing, more specifically, perform charging, exposure, development, transfer, cleaning, and elimination of electricity among electrophotographic image forming processing. Other photoreceptor units 20Y, 20M, and 20C also include the common structure.

The photoreceptor drum 24K is a cylindrical member made of a conductive material such as aluminum and having the outer peripheral surface 241 covered with a photoreceptor, and further the photoreceptor drum is supported in a manner rotatable around a center axis 242 thereof (axis penetrating a center of a circular cross section of the photoreceptor drum 24K in a direction vertical to a sheet surface in FIG. 1C). The photoreceptor is a material in which a charge amount is changed depending on an exposure amount, and includes a layered structure including inorganic materials such as amorphous selenium, a selenium alloy, amorphous silicon, and the like or a plurality of organic materials (OPC). Although not illustrated in FIG. 1C, the center axis 242 of the photoreceptor drum 24K is connected to a drive motor via a rotational force transmission mechanism such as a gear, a belt, or the like. When the photoreceptor drum 24K is rotated once (clockwise direction in FIG. 1C) in response to the rotational force from the motor, each surface portion of the photoreceptor sequentially faces the functional units 201 to 205 in the periphery and is subjected to the processing thereof.

The charging unit 201 includes a wire or a thin plate-shaped electrode 211 extending in an axial direction thereof (normal direction of the sheet surface in FIG. 1C) in a manner spaced from the outer peripheral surface 241 of the photoreceptor drum 24K. For example, corona discharge is generated between the electrode 211 and the outer peripheral surface 241 of the photoreceptor drum 24K by the charging unit 201 applying negative voltage to this electrode 211. Such discharge negatively charges the surface portion of the photoreceptor facing the charging unit 201.

The exposing unit 202 is an opening provided at a portion included in the case body 200 of the photoreceptor unit 20K and located in a gap between the charging unit 201 and the developing unit 203, and the exposing unit exposes, to the outside of the case body 200, a portion included in the outer peripheral surface 241 of the photoreceptor drum 24K and having been charged by the charging unit 201 immediately before. The exposed portion is irradiated with laser light from the optical scanning device 25R through the exposing unit 202.

The optical scanning devices 25L and 25R irradiate the different photoreceptor units 20Y to 20K with laser light modulated with gradation values of different colors out of Y, M, C, K represented by image data. More specifically, one optical scanning device 25L of the two optical scanning devices illustrated in FIG. 1B irradiates different photoreceptor units 20Y and 20M with laser light LLY and LLM modulated with gradation values of the respective colors Y and M, and the other one 25R irradiates other different photoreceptor units 20C and 20K with laser light LLC and LLK modulated with gradation values of the colors C and K. In the photoreceptor unit 20K, the portion included in the outer peripheral surface 241 of the photoreceptor drum 24K and exposed from the exposing unit 202 is scanned in an axial direction (main scanning direction) of the photoreceptor drum 24K with the laser light LLK modulated with the gradation value of the color K. Since the larger a laser light amount is, the less a charge amount in a photoreceptor is, distribution of charge amounts corresponding to change of the laser light amount, that is, one line of an electrostatic latent image representing distribution of the gradation values of the color K is formed on a linear exposure region extending in the main scanning direction. The optical scanning devices 25L and 25R repeat such exposure operation for one line in synchronization with rotation of the photoreceptor drums 24Y to 24K. With this operation, the exposed lines are continuously formed in the rotational direction (hereinafter referred to as "sub-scanning direction") and an electrostatic latent image two-dimensionally spreads on the outer peripheral surfaces 241 of the photoreceptor drums 24Y to 24K.

The developing unit 203 develops the electrostatic latent image on the photoreceptor drum 24K with a toner of the color K. More specifically, the developing unit 203 first stirs two-component developer DVL with two auger screws 231 and 232, and negatively charges a toner included in the developer DVL by friction generated at that time. Next, the developing unit 203 conveys the developer DVL to the nip with the photoreceptor drum 24K by using a developing roller 233. Parallel to this operation, the developing unit 203 applies negative high voltage to the developing roller 233. With this operation, potential in a region included in the electrostatic latent image and having a relatively small charge amount becomes higher than potential of the developing roller 233, and therefore, a toner amount corresponding to a reduced charge amount is separated from the developer conveyed by the developing roller 233. Thus, the electrostatic latent image comes to appear as a toner image.

This toner image is moved to a nip between the photoreceptor drum and the primary transfer roller 22K with rotation of the photoreceptor drum 24K. Since positive high voltage is applied to the primary transfer roller 22K, the negatively charged toner image is transferred from the outer peripheral surface of the photoreceptor drum 24K to the intermediate transfer belt 21.

The cleaning blade 204 is a thin rectangular plate-like member made of a thermosetting resin such as polyurethane rubber, and has a length substantially equal to a portion included in the outer peripheral surface 241 of the photoreceptor drum 24K and covered with the photoreceptor. One plate surface included in the plate surfaces of the cleaning blade 204 and facing the outer peripheral surface 241 of the photoreceptor drum 24K contacts the outer peripheral surface 241 in a state that one (edge) of long sides thereof is parallel to the axial direction of the photoreceptor drum 24K, and scrapes off, from the outer peripheral surface 241, a toner remaining in a place where toner image transfer has been performed. Thus, the outer peripheral surface thereof is cleaned.

The eraser 205 irradiates the outer peripheral surface 241 of the photoreceptor drum 24K with light from light emitting diodes (LED) arrayed in the axial direction of the photoreceptor drum 24K. Remaining electric charge is erased from the portion irradiated with the light in the outer peripheral surface 241. Thus, electricity of the outer peripheral surface 241 is eliminated.

[Structure of Optical Scanning Device]

Figure 2B:
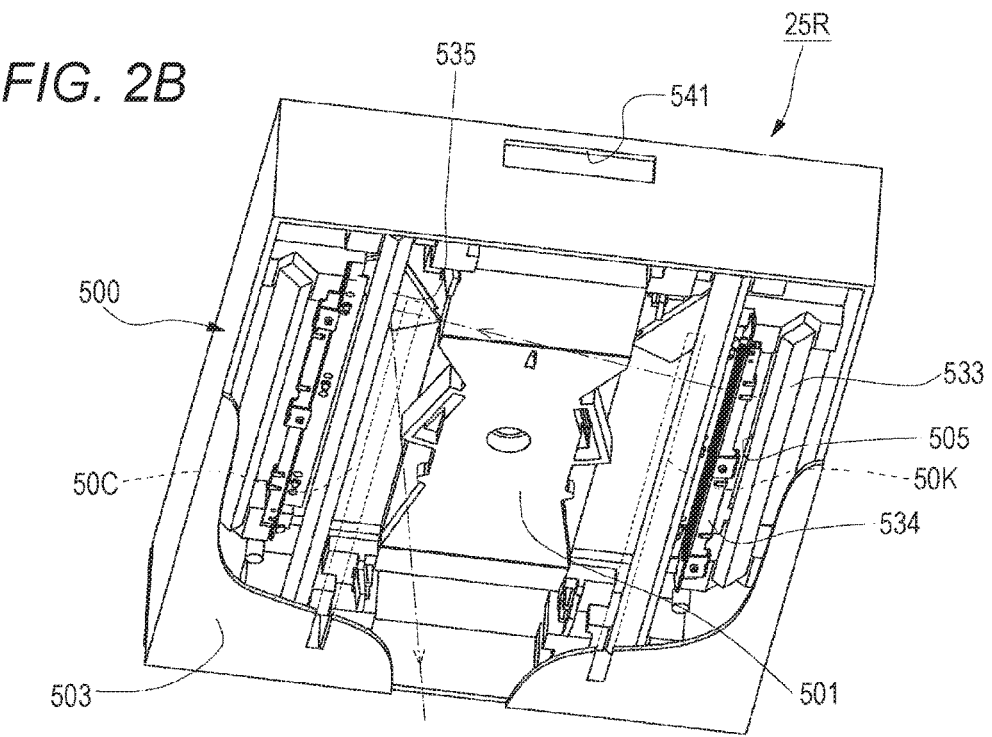
Figure 3A:
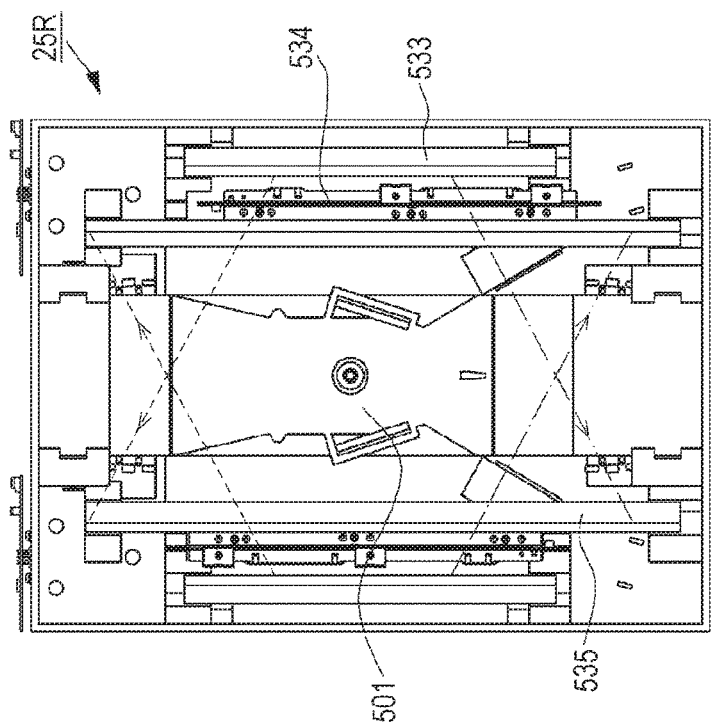
FIGS. 3A and 3B are a top view and a bottom view of an internal structure of the optical scanning device illustrated in FIGS. 2A and 2B respectively.
Figure 3B:
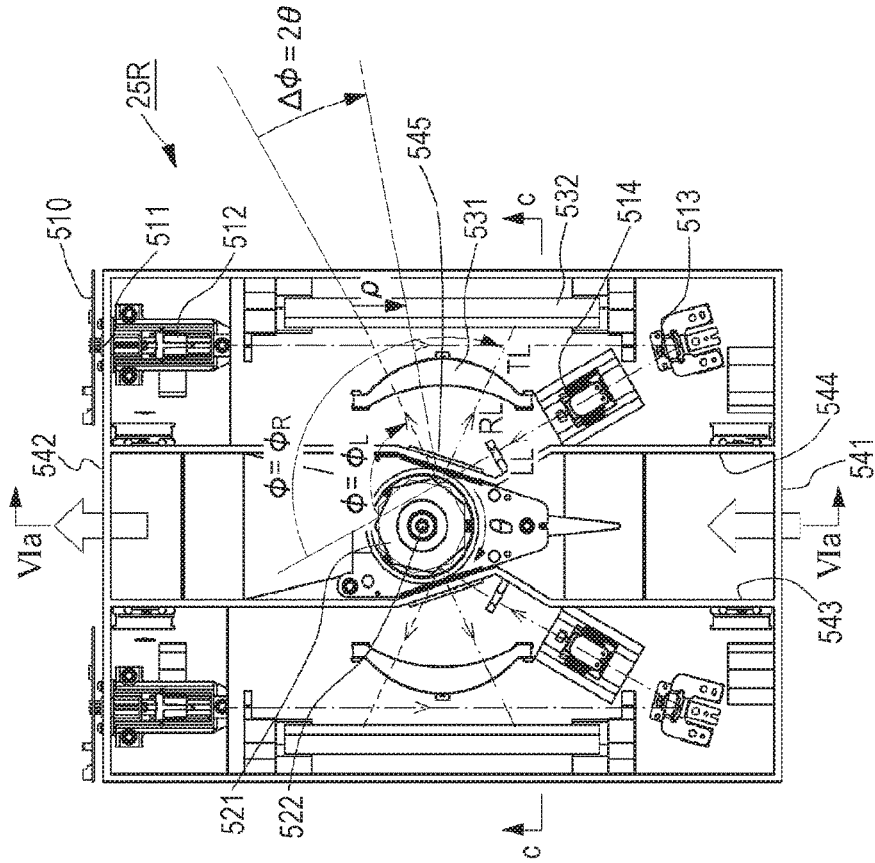
Figure 3C:
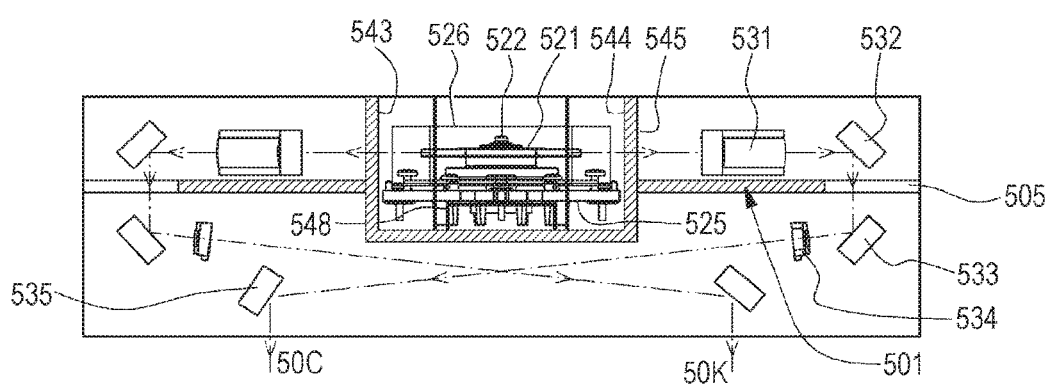
FIG. 3C is a vertical cross-sectional view taken along a line c-c illustrated in FIG. 3A.

FIGS. 2A and 2B are perspective views illustrating appearance of the optical scanning device 25R from different viewpoints. An upper surface 502 (upper cover) of a housing 500 that is a case body of the optical scanning device 25R is viewed in FIG. 2A, and a bottom surface (lower cover) 503 thereof is viewed in FIG. 2B. In FIGS. 2A and 2B, both of the upper surface (upper cover) 502 and the bottom surface (lower cover) 503 are partly removed while remaining one corner in each thereof for convenience of description of an internal structure of the optical scanning device 25R. FIGS. 3A and 3B are a top view and a bottom view of the internal structure of the optical scanning device 25R respectively, and FIG. 3C is a vertical cross-sectional view of the optical scanning device 25R taken along a line c-c illustrated in FIG. 3A. As illustrated in FIGS. 2A and 2B and FIGS. 3A to 3C, the optical scanning device 25R includes, in the housing 500, a light source 510, emission optical systems 512, 513, 514, a deflector 520, and scanning optical systems 531, 532, 533, 534, 535. These elements and arrangement thereof are also similar in the other optical scanning device 25L.

Housing

The housing 500 is, for example, a case body having a rectangular parallelepiped shape, and is supported by a chassis (not illustrated) inside the printer 100 such that longest sides of the case body become parallel to the axial direction common in the photoreceptor drums 24Y to 24K, namely, the main scanning direction (refer to FIG. 1B). The housing 500 includes a base plate 501, the upper cover 502, and the lower cover 503. All of the members 501 to 503 have a rectangular plate-like shape having substantially the same size. Particularly, the base plate 501 is a metal product such as aluminum die cast or a hard resin molded product such as a fiber reinforced resin (FRP), and has high rigidity. The base plate 501 supports the light source 510, emission optical systems 512 to 514, deflector 520, and scanning optical systems 531 to 535 by plate surfaces on both of front and back sides, and determines optical positions thereof. The base plate 501 further includes sidewalls 504. The side walls 504 extend from respective sides of the plate surfaces on both of the front and back sides of the base plate 501 in the normal direction of thereof. The upper cover 502 covers a space surrounded by the plate surface on the front side (the upper surface in FIG. 2A) of the base plate 501 and the side walls 504, and separates the space from the outside. The lower cover 503 covers a space surrounded by the plate surface on the back side (the lower surface in FIG. 2B) of the base plate 501 and the side walls 504, and separates the space from the outside. Thus, an internal space of the housing 500 surrounded by the two covers 502, 503 and the side walls 504 is partitioned into two regions by the base plate 501. In FIG. 2C and FIG. 3C, these regions are positioned in an upper side and a lower side. In the following, these regions will be referred to as an "upper stage" and a "lower stage".

The upper stage includes an intake port 541, an exhaust port 542, and two partition walls 543, 544. The intake port 541 is a through hole opened at one of the side walls of the base plate 501, for example, at a side wall extending from one short side of the plate surface in FIG. 2A, and external air can flow into the upper stage through this port (refer to an arrow AR1 in FIG. 2A). The exhaust port 542 is a through hole opened at a different side wall of the base plate 501, for example, at a side wall extending from the other short side of the plate surface in FIG. 2A, and internal air of the upper stage can flow out from this port (refer to an arrow AR2 in FIG. 2A). The intake port 541 and the exhaust port 542 are located at a center in the short side direction of the side walls of the base plate 501 in FIG. 2A. The partition walls 543 and 544 are wall surfaces extending in a long side direction of the base plate 501 inside the upper stage, and sandwich a space from the intake port 541 to the exhaust port 542 and separates this space from other spaces inside the upper stage. Thus, the partition walls 543 and 544 forms, together with the base plate 501 and the upper cover 502, a duct 540 connecting the intake port 541 to the exhaust port 542. In FIG. 2A, the duct 540 is located in the upper stage at the center in the short side direction of the base plate 501.

A blow fan is installed or a duct outlet port that guides an air flow from a blow fan installed at a different place is installed outside the intake port 541 although not illustrated in FIGS. 2A and 2B. Air flows from these fans enter the duct 540 inside the housing 500 from the intake port 541. The duct 540 guides an entering gas through the space from the intake port 541 to the exhaust port 542. Since the duct 540 separates this space from other spaces in the upper stage, a gas flows inside the duct 540 without leaking to other spaces, particularly, without contacting the optical systems 512 to 514 and 531 to 535, and then flows out of the housing 500 via the exhaust port 542.

Light Source

The light source 510 is a printed circuit board attached to one of the side walls of the housing 500, for example, an external surface of the side wall extending from one of the short sides of the plate surface of the base plate 501 in FIGS. 2A and 3A. One light source 510 is provided for each of the colors Y, M, C, and K represented by image data. In the optical scanning device 25R illustrated in FIG. 2A, two light sources 510 for the two colors C and K are arranged symmetrically with respect to a center line in the short side direction of the plate surface of the base plate 501, particularly, a center of the exhaust port 542. One semiconductor laser 511 and one control circuit thereof (not illustrated) are mounted on each light source 510.

The semiconductor laser 511 includes a laser oscillator such as a laser diode. This laser oscillator is capable of emitting a shot of laser light having a wavelength of 780 nm or 655 nm with output of several mW to a dozen mW, for example. The semiconductor laser 511 emits the laser light into the upper stage of the housing 500 from a through hole opened at a side wall of the housing 500 facing the light source 510.

The control circuit is an electronic circuit dedicated to light emission control for the semiconductor laser 511, and is formed of, for example, an application specific integrated circuit (ASIC) or a programmable integrated circuit (FPGA). The control circuit receives image data from a main control unit built in the printer 100 and modulates a flickering pattern of the semiconductor laser 511 on the basis of a gradation value of the color C or color K represented by the image data. For example, the higher the gradation value of the color C or color K for each pixel is, the longer a light emission time of the semiconductor laser 511 to the pixel is adjusted.

Emission Optical System

The emission optical systems 512 to 514 constitute an optical element group provided for the light source 510 on one-to-one basis, and are arranged outside the duct 540 in the upper stage of the housing 500, and irradiate the deflector 520 with laser light emitted from the light source 510. In the optical scanning device 25R illustrated in FIG. 2A, two groups each including the emission optical systems 512 to 514 are provided for the two light sources 510 and are arranged symmetrically with respect to the center plane in the short side direction of the plate surface of the base plate 501, particularly, a center axis of the duct 540.

The emission optical system includes a collimator lens 512, a mirror 513, and a cylindrical lens 514. The collimator lens 512 converts laser light emitted from the semiconductor laser 511 into parallel light. The mirror 513 reflects and returns the laser light emitted from the collimator lens 512. The cylindrical lens 514 converts the reflected light from the mirror 513 into convergent light in a direction vertical to the plate surface of the base plate 501 and converts the convergent light into parallel light in a direction parallel to the plate surface of the same plate surface.

Deflector

The deflector 520 is arranged inside the duct 540 in the upper stage of the housing 500, and supported by the plate surface of the base plate 501 (the center portion thereof in FIG. 2A). The deflector 520 houses a polygon mirror 521 and a polygon motor (not illustrated in FIG. 2A) in a case body (including bottom plate 525 and top cover 526) (the top cover 526 is partly removed in FIG. 2A). Using the polygon mirror and polygon motor, the deflector 520 deflects laser light incident from the cylindrical lens 514 and periodically changes a deflection angle thereof.

Figure 4A:
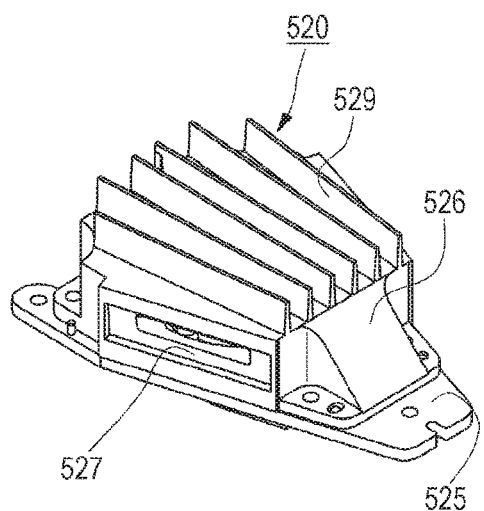
FIGS. 4A and 4C are perspective views illustrating appearance of a deflector illustrated in FIGS. 3A to 3C from different viewpoints.
Figure 4B:
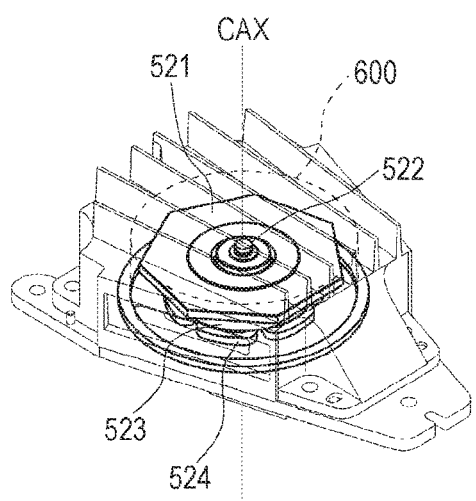
FIGS. 4B and 4D are perspective views illustrating an internal structure of the deflector viewed from the viewpoints same as FIGS. 4A and 4C respectively.
Figure 4C:
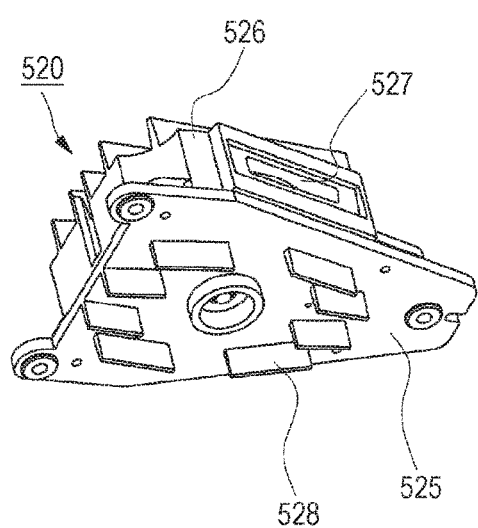
Figure 4D:
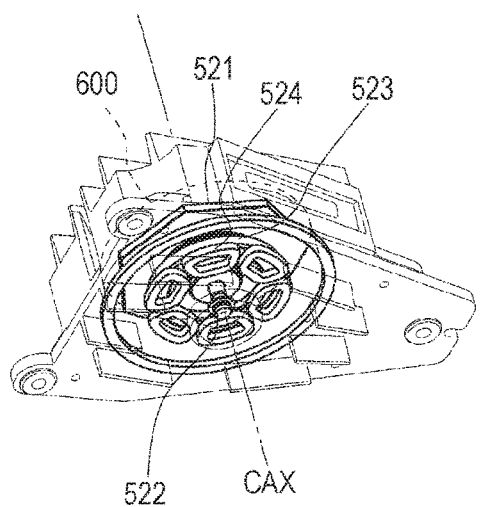

FIGS. 4A and 4C are perspective views illustrating appearance of the deflector 520 from different viewpoints. An upper surface of the case body of the deflector 520 is viewed in FIG. 4A, and a bottom surface thereof is viewed in FIG. 4C. FIGS. 4B and 4D are perspective views respectively illustrating appearance in a case of viewing an internal structure of the deflector 520 from the viewpoints same as those of FIGS. 4A and 4C. In FIGS. 4B and 4D, the case body (including bottom plate 525 and top cover 526) of the deflector 520 is illustrated in a transparent manner for convenience of description.

The case body of the deflector 520 includes a bottom plate 525 and a top cover 526. Both of the members 525 and 526 are made of a metal having high heat conductivity, such as aluminum, or a resin. The bottom plate 525 has a substantially trapezoidal plate shape and is fixed to the base plate 501, for example, with a screw in a posture in which an upper base of the trapezoid is oriented to the intake port 541 and a lower base thereof is oriented to the exhaust port 542 as illustrated in FIGS. 2A and 3A. The bottom plate 525 supports, on a plate surface thereof, a substrate (not illustrated, hereinafter referred to as "motor substrate) on which the polygon mirror 521, a shaft 522, polygon motors 523, 524 and a driving circuit thereof (hereinafter referred to as "polygon motors and the like") are mounted. The top cover 526 is a box-like member not having a bottom, and covers the entire plate surface of the bottom plate 525. Since a space between an edge of the top cover 526 and an edge of the bottom plate 525 is sealed, the polygon mirror 521, shaft 522, polygon motors 523, 524, and the like are airtightly enclosed in the space inside the top cover 526. A cylindrical inner wall 600 is provided inside the top cover 526. The inner wall 600 is molded integrally with the top cover 526 from a metal having high heat conductivity, such as aluminum, or a resin Since a center axis CAX of the inner wall 600 is vertical to the plate surface of the bottom plate 525 and arranged coaxially with the shaft 522, the inner wall 600 surrounds an outer periphery of the polygon mirror 521. Two translucent windows 527 are provided in side surfaces of the top cover 526 and also in the inner wall 600. Each translucent window 527 is made of, for example, transparent glass or a resin, and faces a similar a translucent window 545 (refer to FIG. 2A) provided in each of the partition walls 543 and 544 of the housing 500.

The polygon mirror 521 is a member shaped like a regular polygonal column (for example, a regular heptagon column in FIGS. 2A to 4D), and all of side surfaces are mirror-finished. With this structure, each of the side surfaces reflects and deflects incident light. These side surfaces will be referred to as "deflection surfaces" in the following. The polygon mirror 521 further includes a bearing (not illustrated) at the center.

The shaft 522 is a thin long columnar shaft, and fixed to the bottom plate 525 in a direction vertical to the plate surface of the bottom plate. The shaft 522 penetrates a center portion of the polygon mirror 521, and an outer peripheral surface is made to contact the bearing. With this structure, the shaft 522 rotatably supports the polygon mirror 521 around itself, and regulates, particularly, a rotation axis of the polygon mirror 521 (a virtual straight line indicating the center of rotary motion) so as to conform to the center axis of the own shaft.

The polygon motor is, for example, a brushless DC motor (BLDC), and includes a rotor 523 and a stator 524. The rotor 523 is an annular member formed of a permanent magnet such as neodymium and is coaxially fixed to the polygon mirror 521. The stator 524 is a plurality of windings arranged concentrically with the shaft 522 and is fixed to the bottom plate 525 together with the motor substrate (not illustrated). These windings 524 alternately receive current from the driving circuit mounted on the motor substrate. As a result, magnetic field distribution generated by the windings 524 periodically is changed and applies rotational force around the shaft 522 to the permanent magnet 523. This rotational force rotates the polygon mirror 521 around the shaft 522.

While the polygon motor rotates the polygon mirror 521 at a constant angular velocity, laser light LL from the light source 510 is incident to the polygon mirror 521 from the cylindrical lens 514 through the translucent windows 545 of the partition walls 543 and 544 and the translucent windows 527 of the top cover 526 of the deflector 520 as illustrated in FIG. 3A. Particularly, an image of the incident light LL is formed by the cylindrical lens 514 on a deflection surface of the polygon mirror 521 in a direction vertical to the plate surface of the base plate 501, and remains as parallel light in a direction parallel to the same plate surface. The incident light LL is reflected by the deflection surface of the polygon mirror 521, and reflected light RL travels to the scanning optical systems 531 to 535 through the translucent windows 527 of the top cover 526 of the deflector 520 and the translucent windows 545 of the partition walls 543 and 544. An angle formed by the travel directions of the incident light LL and the reflected light RL, that is, a deflection angle $\phi$ is changed by rotation of the polygon mirror 521. More specifically, while inclination of a deflection surface with respect to incident light LL is continuously changed, the deflection angle $\phi$ is continuously changed from one to the other of a minimum value $\phi_L$ and a maximum value $\phi_R$, and at a moment when the deflection surface at which the incident light LL has been reflected is switched to a next deflection surface, the deflection angle $\phi$ returns from the other to one of the minimum value $\phi_L$ and a maximum value $\phi_R$. While the polygon mirror 521 is rotated, the above-described change in the deflection angle $\phi$ is periodically repeated.

Scanning Optical System

Similar to the emission optical systems 512 to 514, the scanning optical systems 531 to 535 constitute an optical element group provided for the light source 510 on one-to-one basis. Different from the emission optical systems 512 to 514, the scanning optical systems 531 to 535 are arranged not only in the upper stage but also in the lower stage of the housing 500, and laser light RL reflected from the polygon mirror 521 is emitted to the outside from slits 50C and 50K opened at the lower cover 503 of the housing 500, and forms an image on the outer peripheral surfaces of the photoreceptor drums 24C and 24K exposed from the exposing units 202 of the photoreceptor units 20C and 20K. In the optical scanning device 25R illustrated in FIGS. 2A and 2B, two groups each including the scanning optical systems 531 to 535 are provided for the two light sources 510 are arranged symmetrically with respect to the center plane in the short side direction of the plate surface of the base plate 501.

The scanning optical system includes an fθ lens 531, a first folding mirror 532, a second folding mirror 533, an image forming lens 534, and a third folding mirror 535. The fθ lens 531 and first folding mirror 532 are arranged in the upper stage of the housing 500, and the second folding mirror 533, image forming lens 534, and third folding mirror 535 are arranged in the lower stage. The fθ lens 531 transmits reflected light RL from the polygon mirror 521 and irradiates the first folding mirror 532. All of the first folding mirror 532, second folding mirror 533, and third folding mirror 535 are thin long plate members, and have plate surfaces mirror-finished. As illustrated in FIGS. 2A and 2B and FIGS. 3A to 3C, all of the folding mirrors 532, 533, and 535 are arranged in a manner such that longitudinal directions thereof are parallel to the longitudinal direction of the base plate 501 of the housing 500, namely, the main scanning direction. The first folding mirror 532 reflects transmitted light RL from the fθ lens 531 and emits the reflected light to the lower stage of the housing 500 through a slit 505 opened at the plate surface of the base plate 501. This reflected light is reflected by the second folding mirror 533 and emitted to the image forming lens 534. The image forming lens 534 converts the reflected light from the second folding mirror 533 into convergent light. The transmitted light from the image forming lens 534 is reflected by the third folding mirror 535 and emitted to the outside from the slits 50C and 50K of the lower cover 503 of the housing 500.

The fθ lens 531 is a compound lens generally formed of two or more aspherical lenses (not illustrated), and forms an image of the reflected light RL from the polygon mirror 521 on the surface of the photoreceptor drum 24C or 24K in cooperation with the image forming lens 534. When the deflection angle is changed by rotation of the polygon mirror 521, transmitted light TL from the fθ lens 531 is moved in the longitudinal direction above each of the folding mirrors 532, 533, and 535 in accordance with such change of the deflection angle, and therefore, an image forming point of the transmitted light TL is moved in the axial direction (main scanning direction) on the surface of the photoreceptor drum 24C or 24K. The fθ lens 531 makes an incidence angle of the incident light RL proportional to a formed image height of the transmitted light TL (distance from an optical axis of the image forming point). With this characteristic, a change amount in the deflection angle $\phi$ caused by rotation of the polygon mirror 521 is proportional to a moved distance of the image forming point of the transmitted light TL. More specifically, for example, in a case where the polygon mirror 521 is rotated clockwise by an angle $\theta$ and the deflection angle $\phi$ is increased from the minimum value $\phi_L$ by a change amount $\Delta\phi$ as illustrated in FIG. 3A, the transmitted light TL from the fθ lens 531 is moved above the first folding mirror 533 by a distance $\Delta\rho$. This distance $\Delta\rho$ is proportional to the change amount $\Delta\phi$ in the deflection angle $\phi$. The distance $\Delta\rho$ is proportional to the moved distance of the image forming point on the surface of the photoreceptor drum 24C or 24K, and the change amount $\Delta\phi$ in the deflection angle $\phi$ is twice a change amount $\theta$ in the rotation angle of the polygon mirror 521: $\Delta\phi=2\theta$. Therefore, linearity is established between a position in the main scanning direction of the image forming point and the rotation angle of the polygon mirror 521. Particularly, when the polygon mirror 521 is rotated at a constant angular velocity, the image forming point is moved in the main scanning direction at the same velocity while the deflection angle $\phi$ is continuously changed.

[Heat Exhausting from Deflector Utilizing Duct]

As illustrated in FIG. 2A, the deflector 520 is located in the center of the duct 540. As illustrated in FIG. 3C, the base plate 501 is recessed in the vicinity of the deflector 520 and faces the bottom plate 525 of the deflector 520 at a distance. Similarly, the upper cover 502 of the housing 500 and the partition walls 543, 544 of the duct 540 all face the top cover 526 of the deflector 520 at a distance. A flow path for a gas flowing from the intake port 541 to the exhaust port 542 is formed in a gap thus secured between the base plate 501 and the bottom plate 525 and a gap secured between the upper cover 502, the partition walls 543, 544, and the top cover 526 (refer to arrows AR1 and AR2 illustrated in FIG. 2A).

As illustrated in FIGS. 4B and 4D, since the polygon motors 523, 524 and the like are supported by the bottom plate 525, most of heat generated therefrom spreads in the entire case body of the deflector 520 from the bottom plate 525 to the top cover 526. The heat is further dissipated to the gaps formed with the inner surface of the duct 540 from an entire outer surface of the case body (including bottom plate 525 and top cover 526) of the deflector 520, and then exhausted to the outside of the housing 500 from the exhaust port 542 by an air flow passing through the gaps from the intake port 541.

As illustrated in FIGS. 4A and 4C, both of the bottom plate 525 and the top cover 526 of the deflector 520 include heat radiation members 528 and 529 on outer surfaces thereof. The heat radiation members 528 and 529 are multiple protruding plates protruding from the respective outer surfaces of the bottom plate 525 and the top cover 526, and increase substantial surface areas of these outer surfaces to increase a heat amount dissipated per unit time.

As illustrated in FIGS. 2A, 3A, and 3C, the duct 540 surrounds the space from the periphery of the deflector 520 to the exhaust port 542, and separates the space from the optical systems 512 to 535. With this structure, the air flow flows inside the duct 540 from the intake port 541 to the exhaust port 542 without contacting the optical system 512 to 535. Therefore, the heat taken away from the case body (including bottom plate 525 and top cover 526) of the deflector 520 by the air flow passing through the gaps in the periphery thereof does not leak together with this air flow from the duct 540 to other spaces in the upper stage of the housing 500, and is dissipated from the exhaust port 542 to the outside of the housing 500. Thus, exhaust heat efficiency from the deflector 520 is secured high. Particularly, even in a case where a heat generation amount by the polygon motors 523, 524 and the like is increased due to increase of the rotation speed of the polygon mirror 521, distortion caused by overheat of the optical systems 512 to 535 is prevented.

[Timer Wall Included in Case Body of Deflector]

Figure 5A:
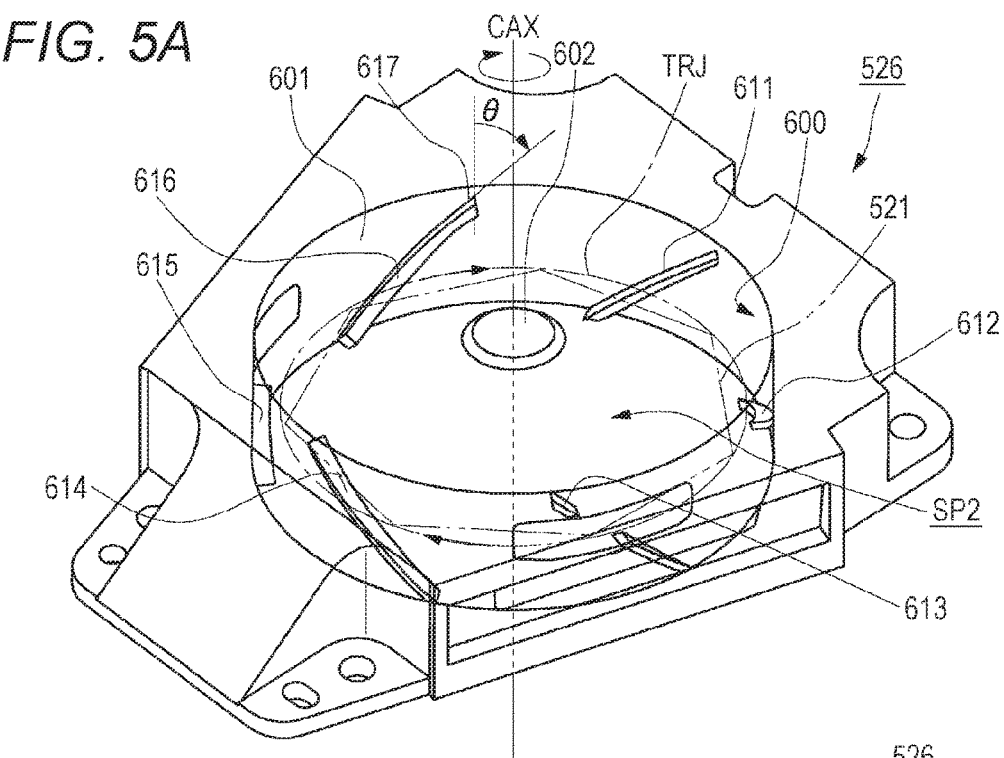
FIGS. 5A and 5B are perspective views illustrating an inner wall of a top cover of the deflector from different viewpoints.
Figure 5B:
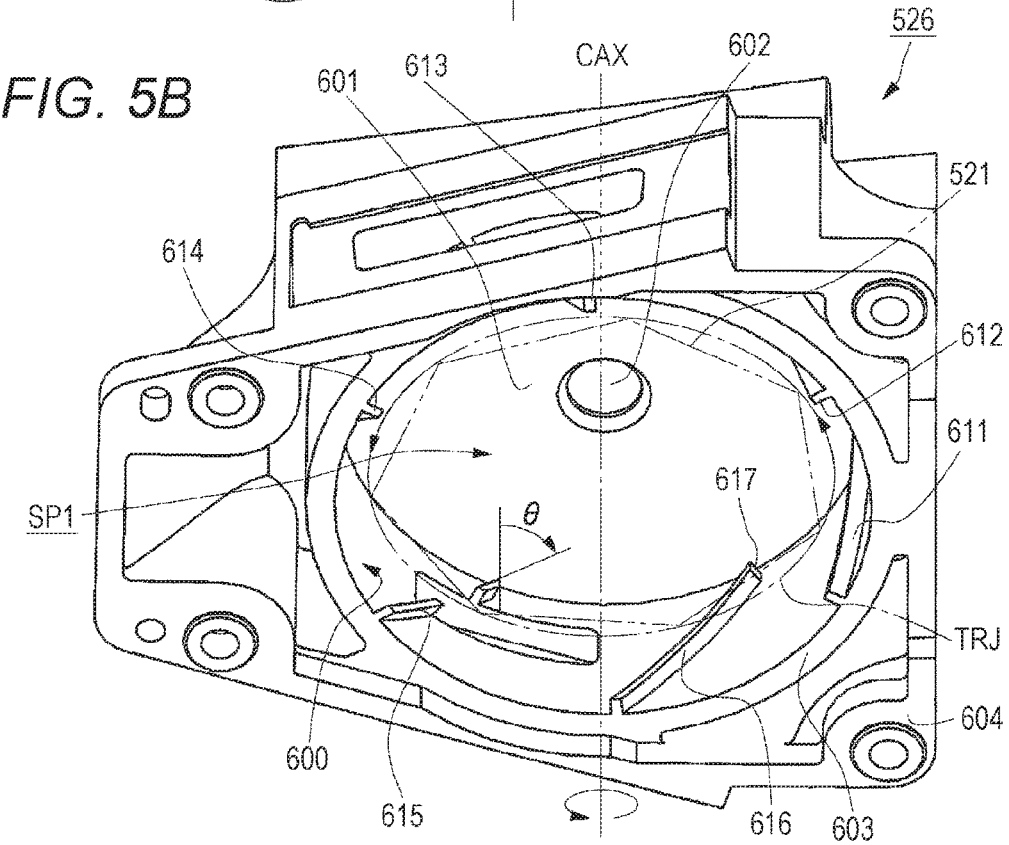

FIGS. 5A and 5B are perspective views illustrating the inner wall 600 of the top cover 526 of the deflector 520 from different viewpoints. The outer surface of the top cover 526 is viewed in FIG. 5A, and the inner surface thereof is viewed in FIG. 5B. The top cover 526 is illustrated in a transparent manner in FIG. 5A, and the heat radiation member 529 illustrated in FIG. 4A is removed for convenience of description. The inner wall 600 is a cylindrical wall extending from the ceiling 601 of the top cover 526 toward the bottom, in which an opening on an upper end side is closed with the ceiling 601 and an opening on a lower end side is opened. A lower end surface 603 of the inner wall 600 is higher than a bottom surface 604 at an edge of the top cover 526. A circular recess 602 is further provided at the ceiling 601 in a manner coaxially with the inner wall 600. In a state in which the top cover 526 covers the bottom plate 525 as illustrated in FIGS. 4A and 4C, the motor substrate (not illustrated) on the bottom plate 525 is fitted into a gap formed by a level difference between the bottom surface 604 at the edge of the top cover 526 and the lower end surface 603 of the inner wall 600, and the bottom surface 604 of the top cover 526 is airtightly bonded to the edge of the bottom plate 525. Additionally in this state, the outer peripheral surface (deflection surface) of the polygon mirror 521 faces the inner wall 600 at a distance, and an upper end surface of the shaft 522 further faces the recess 602 of the ceiling 601 at a distance. Particularly, since the gap between the outer peripheral surface of the polygon mirror 521 and an inner surface of the inner wall 600 is narrow, the polygon mirror 521 substantially partitions, by setting this gap as a boundary, the space surrounded by the inner wall 600 (hereinafter referred to as "sealed space") into a first space SP1 located on a side of the polygon motors 523, 524 and the like and a second space SP2 located on an opposite side. The polygon mirror 521 and the shaft 522 are rotated clockwise around the center axis CAX of the inner wall 600 in the view from the ceiling 601 side while keeping the distance from the inner surfaces (inner wall 600 and recess 602) of the top cover 526 as described above. The air flow generated in the sealed space by this rotation does not leak out of the top cover 526 and continues circulating in the sealed space. Since the gap between the outer peripheral surface of the polygon mirror 521 and the inner surface of the inner wall 600 is sufficiently narrow, the air flow is stabilized as a large vortex around the center axis CAX in the circumferential direction of the inner wall 600, and stably circulates in each of the first space SP1 and the second space SP2 in the axial direction. Particularly, turbulence is hardly generated. As a result, since air resistance received by the polygon mirror 521 from air flows is suppressed, wind noise is decreased and consumption current (windage loss) of the polygon motors 523, 524 and the like is reduced.

Rectifier of Inner Wall

Since the gap between the inner surface of the inner wall 600 and the outer peripheral surface of the polygon mirror 521 is narrow, convection is hardly generated between the first space SP1 and the second space SP2, and the first space SP1 tends to be filled with heat from the polygon motors 523, 524 and the like. Therefore, it is necessary to take measure to release heat from the first space SP1 to the second space SP2 while keeping the gap between the inner surface of the inner wall 600 and the polygon mirror 521 sufficiently narrow in order to prevent malfunction caused by overheat of the polygon mirror 521, the polygon motors 523, 524 and the like while continuously and sufficiently minimizing a risk of turbulence in the sealed space. (In this sense, the first space SP1 and the second space SP2 will be referred to as "heat generation space" and "cooling space" respectively in the following.) A rectifier is provided at the inner surface of the inner wall 600 as this measure. The rectifier is a shaped portion integrally molded with the inner wall 600 from a metal having high heat conductivity, such as aluminum, or a resin, and includes a plurality of wing-like surfaces 611 to 616, for example. Utilizing these wing-like surfaces, the rectifier guides, from among air flows circulating in the respective heat generation space SP1 and cooling space SP2, a component flowing from one to the other of the two spaces SP1 and SP2.

Figure 6A:
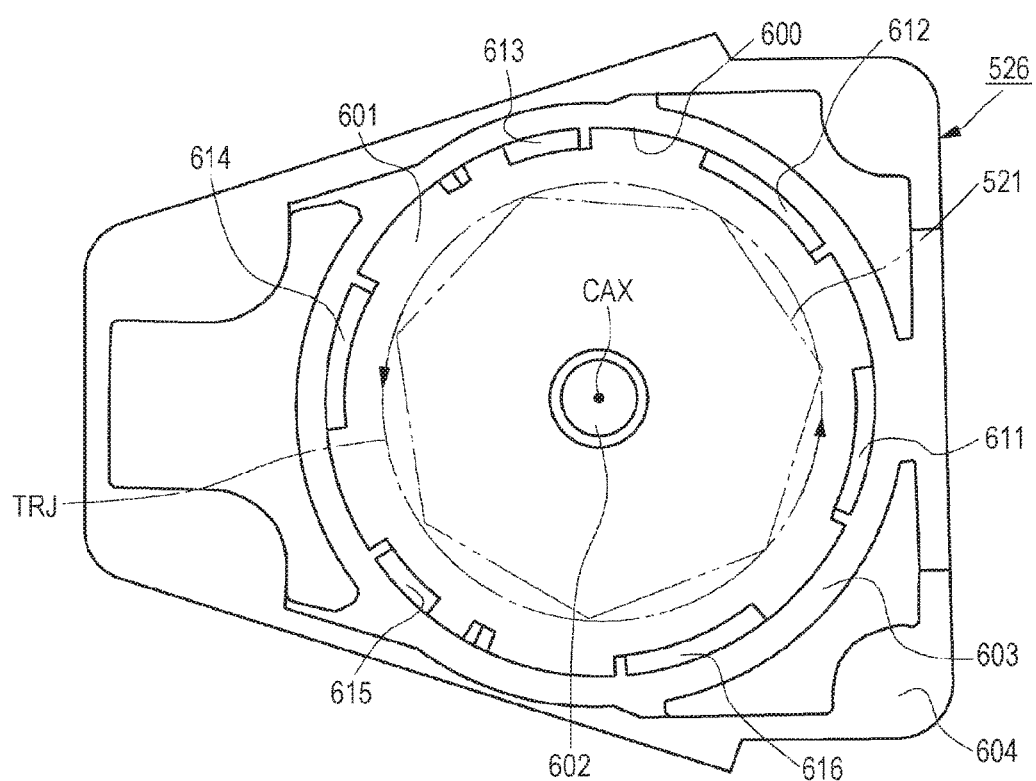
FIG. 6A is a view illustrating the inside of the inner wall in the view from a bottom side of the top cover of the deflector.

The six wing-like surfaces 611 to 616 are also illustrated in FIGS. 5A and 5B. FIG. 6A is a view illustrating the inside of the inner wall 600 in the view from the bottom surface side of the top cover 526. The wing-like surfaces 611 to 616 are members radially projecting from portions located at equal intervals in the circumferential direction of the inner surface of the inner wall 600, and each thereof extends obliquely from the lower end of the inner wall 600 along the inner surface of the inner wall to the rotation axis of the polygon mirror 521, namely, the center axis CAX of the inner wall 600. As illustrated in FIG. 6A, the wing-like surfaces are spaced apart in the circumferential direction. Each one of the wing-like surfaces 611 to 616 has a thin long plate shape, and a width, a thickness, and an inclination angle θ (0°<θ<90°) with respect to the center axis CAX are uniform in an entire length thereof. The length, width, thickness, and the inclination angle θ are common between the wing-like surfaces 611 to 616. The common length reaches from the heat generation space SP1 to the cooling space SP2, and any of upper ends 617 thereof is closer to the ceiling 601 of the top cover 526 than the polygon mirror 521. The common width is designed so as not to overlap a circular trajectory TRJ drawn by the outer peripheral surface of the polygon mirror 521 when the polygon mirror 521 is rotated. A common inclined direction is the same as the rotational direction of the polygon mirror 521, that is, clockwise in the view from the ceiling 601 side. Thus, the shapes and arrangement of the six wing-like surfaces 611 to 616 exhibit 6-fold rotational symmetry around the center axis CAX. As a result, these wing-like surfaces 611 to 616 each guide, from among air flows circulating in the respective heat generation space SP1 and cooling space SP2, a component flowing from one to the other of the two spaces SP1 and SP2 without breaking respective axisymmetric shapes as described below.

Figure 6B:
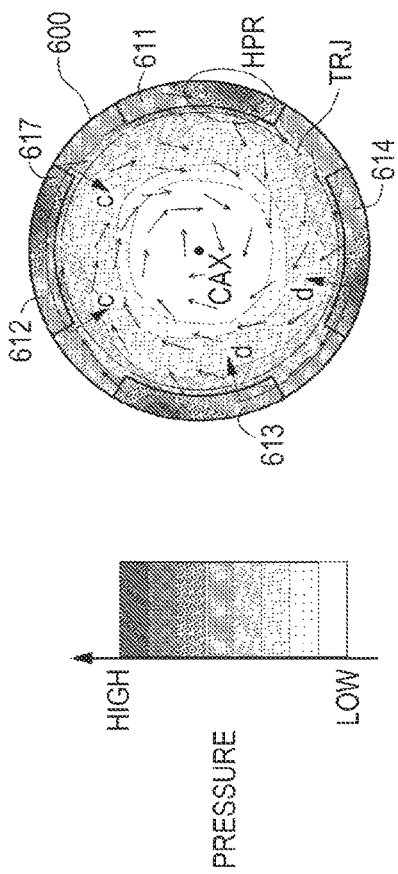
FIGS. 6B to 6D are diagrams illustrating distribution of directions and pressures of air flows in a sealed space surrounded by the inner wall.
Figure 6D:
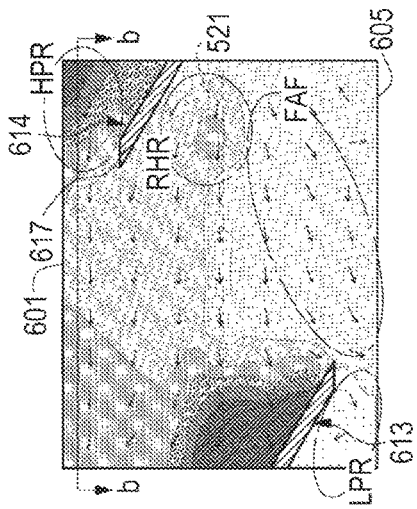
Figure 6C:
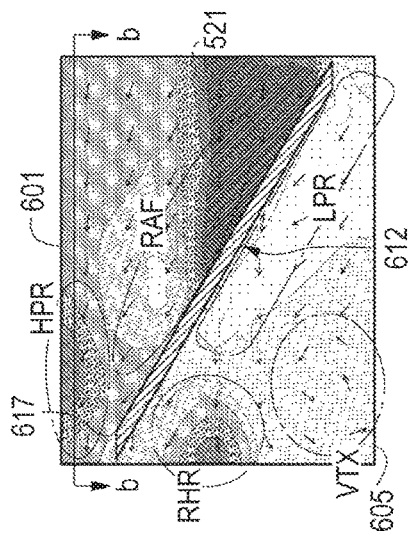

FIGS. 6B to 6D are diagrams illustrating distribution of directions and pressures of air flows in the sealed space obtained from simulation. Meanwhile, FIGS. 6B to 6D illustrate an example of having four wing-like surfaces 611 to 614 in order to reduce a calculation amount in the simulation. FIG. 6B is a diagram in a case of viewing, from the ceiling 601 side of the top cover 526, distribution in a plane traversing the cooling space SP2 in a direction vertical to the axial direction (normal direction of a sheet surface in the drawing), and FIGS. 6C and 6D are diagrams in a case of viewing, from the outside of the inner wall 600, distribution in a vertical cross section of the sealed space taken along circular arcs c-c and d-d illustrated in FIG. 6B, respectively. Both of the arcs c-c and d-d are concentric with the trajectory TRJ of the outer peripheral surface of the polygon mirror 521 indicated by a dashed line in FIG. 6B, and have radii larger than that of the trajectory TRJ. FIGS. 6C and 6D further indicate a position in a lateral cross section of the cooling space SP2 illustrated in FIG. 6B by a straight line b-b, and indicate a position of the polygon mirror 521 by a broken line. This lateral cross section of the cooling space SP2 is closer to the ceiling 601 than the upper surface of the polygon mirror 521. In FIGS. 6B to 6D, a direction of a thin arrow (having a constant length) indicates a direction of an air flow, and pressures of air flows are indicated by regional patterns classified in eight levels. (The denser the pattern is, the higher the pressure is.

An air flow in the cooling space SP2 largely swirls around the center axis CAX on an inner side of the trajectory TRJ of the outer peripheral surface of the polygon mirror 521. Both of distribution of directions and distribution of pressures of the air flows are substantially axisymmetric. On the other hand, air flows include a high pressure region HPR above respective upper ends 617 of the wing-like surfaces 611 to 614 on an outer side of the trajectory TRJ of the outer peripheral surface of the polygon mirror 521. This is caused by the following reason. As illustrated in FIGS. 6C and 6D, in the heat generation space SP1, an air flow collides with respective lower half portions 618 of the wing-like surfaces 611 to 614 and increases a pressure in the vicinity thereof. With this pressure increase, a component RAF ascending from the heat generation space SP1 to the cooling space SP2 along the wing-like surfaces 611 to 614 is generated in this air flow. This ascending component RAF collides with the ceiling 601 of the top cover 526 above the respective upper ends 617 of the wing-like surfaces 611 to 614, and generates the high pressure region HPR.

The air flows in the heat generation space SP1 include a low pressure region LPR on the lower side thereof as illustrated in FIG. 6C because a flow rate flowing under the respective wing-like surfaces 611 to 614 is reduced by generation of the ascending component RAF. In this low pressure region LPR, an air flow ascends in an accelerate manner, and collides with an air flow in the cooling space SP2 or generates a small vortex VTX having an axis in a radial direction. As a result, a relatively high pressure region RHR is generated at a boundary between the heat generation space SP1 and the cooling space SP2 in a range from below the respective upper ends 617 of the wing-like surfaces 611 to 614 to downstream sides thereof. In this region RHR, an air flow in the heat generation space SP1 intercrosses with an air flow in the cooling space SP2, and particularly, a component FAF descending from the cooling space SP2 to the heat generation space SP1 is generated. With this component, the flow rate in the heat generation space SP1 lost by the ascending component RAF is compensated from the air flow in the cooling space SP2.

Thus, the wing-like surfaces 611 to 614 each guide, from among the air flows circulating in the respective heat generation space SP1 and cooling space SP2, the components RAF and FAF moved from one to the other of the two spaces SP1 and SP2. Since existence of these components RAF and FAF is limited on the outer side of the trajectory TRJ of the outer peripheral surface of the polygon mirror 521 and also is stationary, the air resistance caused by these components RAF and FAF and received by the polygon mirror 521 is sufficiently little. On the other hand, heat from the polygon motors 523, 524 and the like is diffused from the heat generation space SP1 to the cooling space SP2 by convection generated by these components RAF and FAF as described below.

FIGS. 7A to 7E are diagrams illustrating distribution of directions and temperatures of air flows in the sealed space obtained from simulation. Similar to FIGS. 6A to 6D, FIGS. 7A to 7E illustrate examples of having the four wing-like surfaces 611 to 614. Similar to FIG. 6B, FIG. 7A is a view in a case of viewing, from the ceiling 601 side of the top cover 526, distribution in the lateral cross section of the cooling space SP2. FIGS. 7B and 7C are respectively distribution diagrams in the vertical cross sections of the sealed space taken along diameters b-b and c-c illustrated in FIG. 7A. One diameter b-b thereof traverses the wing-like surfaces 612 and 614, and the other diameter c-c passes between the wing-like surfaces 611 and 612. FIGS. 7D and 7E are diagrams in a case of viewing, from the outside of the inner wall 600, distributions in the vertical cross sections of the sealed space taken along arcs d-d and e-e illustrated in FIG. 7A, respectively. Both of the arcs d-d and e-e are concentric with the trajectory TRJ of the outer peripheral surface of the polygon mirror 521 indicated by a dashed line in FIG. 7A, and have radii larger than that of the trajectory TRJ. One arc d-d thereof vertically traverses an entire length of the wing-like surface 612, and the other arc e-e extends between adjacent wing-like surfaces. FIGS. 7B to 7D indicate a position in the lateral cross section of the cooling space SP2 illustrated in FIG. 7A by a straight line a-a, and FIGS. 7D and 7E illustrate a position of the polygon mirror 521 by a broken line. This lateral cross section of the cooling space SP2 is closer to the ceiling 601 than the upper surface of the polygon mirror 521. In FIGS. 7A to 7E, a direction of a thin arrow (having a constant length) indicates a direction of an air flow, and temperatures of air flows are indicated by regional patterns classified in eight levels. (Particularly, the denser the pattern is, the higher the temperature is.) Meanwhile, since temperature change in the lateral cross section illustrated in FIG. 7A is smaller than that in the vertical cross sections illustrated in FIGS. 7B to 7E, a temperature range corresponding to each of the patterns is set narrow.

As illustrated in FIG. 7A, an air flow largely swirls around the center axis CAX in the circumferential direction in a direction same as rotation of the polygon mirror 521, namely, a clockwise direction. This is common in both of the heat generation space SP1 and the cooling space SP2. On the other hand, as illustrated in FIGS. 7B and 7C, an air flow largely circulates in each of the spaces SP1 and SP2 in the axial direction. More specifically, an air flow in the heat generation space SP1 is moved radially away from the center axis CAX in the vicinity of the lower surface of the polygon mirror 521, descends in the vicinity of the inner wall 600, is moved radially close to the center axis CAX in the vicinity of the upper surface 605 of the motor substrate, and ascends in the vicinity of the center axis CAX. An air flow in the cooling space SP2 is moved radially away from the center axis CAX in the vicinity of the upper surface of the polygon mirror 521, ascends in the vicinity of the inner wall 600, is moved radially close to the center axis CAX in the vicinity of the ceiling 601 of the top cover 526, and descends in the vicinity of the center axis CAX.

In addition to this global circulation, as illustrated in FIG. 7D, a component RAF ascending from the heat generation space SP1 to the cooling space SP2 along each of the wing-like surfaces 611 to 614 exists on the outer side of the trajectory TRJ of the outer peripheral surface of the polygon mirror 521. Since this component RAF carries heat from the heat generation space SP1 to the cooling space SP2, a region HTR having a temperature higher than those in other regions of the cooling space SP2 spreads above the respective upper ends 617 of the wing-like surfaces 611 to 614. The heat thus carried by the ascending component RAF from the heat generation space SP1 to the cooling space SP2 is further diffused toward the center axis CAX by a vortex around the center axis CAX illustrated in FIG. 7A. Due to this, the high temperature region HTR extends along a flow of the vortex toward the center axis CAX from above the respective upper ends 617 of the wing-like surfaces 611 to 614.

As illustrated in FIGS. 7C and E, a component FAF descending from the cooling space SP2 to the heat generation space SP1 also exists between the adjacent wing-like surfaces 611 to 614 on the outer side of the trajectory TRJ of the outer peripheral surface of the polygon mirror 521. Since this component FAF takes heat away from the periphery of the heat generation space SP1, a region LTR having a temperature lower than those in other regions in the heat generation space SP1 spreads in a rage from above the respective lower half portions 618 of the wing-like surfaces 611 to 614 to the vicinity and also the lower side thereof as illustrated in FIGS. 7C to 7E. As illustrated in FIG. 7B, the low temperature region LTR further extends toward the center axis CAX from below the lower side of the wing-like surfaces 611 to 614 along the air flow circulating inside the heat generation space SP1.

Thus, the ascending component RAF diffuses the heat of the polygon motors 523, 524 and the like from the heat generation space SP1 to the cooling space SP2, and the descending component FAF cools the heat generation space SP1. As a result, an excessive temperature increase in the heat generation space SP1 caused by excessive accumulation of heat from the polygon motors and the like is prevented, and therefore, malfunction caused by overheat of the polygon mirror 521, the polygon motors 523, 524, and the like is prevented.

Advantages of Embodiment

In the optical scanning device 25R according to the embodiment of the present invention, the top cover 526 of the deflector 520 includes the inner wall 600 surrounding the outer periphery of the polygon mirror 521 as described above. Since the gap between the inner surface of the inner wall 600 and the outer peripheral surface of the polygon mirror 521 is sufficiently narrow, an air flow inside the sealed space is stabilized as a large vortex around the center axis CAX in the circumferential direction of the inner wall 600, and circulates in each of the heat generation space SP1 and the cooling space SP2 in the axial direction. Particularly, tuthulence is hardly generated. As a result, since air resistance received by the polygon mirror 521 from air flows is suppressed, wind noise is decreased and consumption current (windage loss) of the polygon motors 523, 524 and the like is reduced.

The inner wall 600 further includes wing-like surfaces 611 to 616. The wing-like surfaces 611 to 616 are thin plate-like members radially projecting from the inner surface of the inner wall 600, arranged at equal intervals in the circumferential direction, and inclined toward the center axis CAX of the inner wall 600 in a direction same as the rotational direction of the polygon mirror 521. An air flow above each of the wing-like surfaces 611 to 616 includes a component RAF ascending from the heat generation space SP1 to the cooling space SP2. Since this component RAF carries heat from the heat generation space SP1 to the cooling space SP2, a region HTR having a temperature higher than those in other regions of the cooling space SP2 spreads above the respective upper ends 617 of the wing-like surfaces 611 to 616. On the other hand, an air flow between the adjacent wing-like surfaces 611 to 616 includes a component FAF descending from the cooling space SP2 to the heat generation space SP1. Since this component FAF takes heat away from the periphery of the heat generation space SP1, a region LTR having a temperature lower than those in other regions of the heat generation space SP1 spreads in a range from above the respective lower half portions 618 of the wing-like surfaces 611 to 616 to the vicinity and also the lower side thereof. Thus, the wing-like surfaces 611 to 616 each guide, from among air flows circulating in the respective heat generation space SP1 and cooling space SP2, the components RAF and FAF moved from one to the other of the two spaces SP1 and SP2. The ascending component RAF diffuses the heat of the polygon motors 523, 524 and the like from the heat generation space SP1 to the cooling space SP2, and the descending component FAF cools the heat generation space SP1. As a result, an excessive temperature increase in the heat generation space SP1 caused by excessive accumulation of heat from the polygon motors and the like is prevented, and therefore, malfunction caused by overheat of the polygon mirror 521, the polygon motors 523, 524, and the like is prevented. Furthermore, since the shapes and arrangement of the wing-like surfaces 611 to 616 are symmetric around the center axis CAX of the inner wall 600, the ascending component RAF and the descending component FAF guided by these wing-like surfaces are stable both spatially and temporally. Therefore, air resistance caused by these components RAF and FAF and received by the polygon mirror 521 is sufficiently small. Thus, in the optical scanning device 25R, even when the rotation speed of the polygon mirror 521 is increased, a risk of tuthulence around the polygon mirror 521 is kept sufficiently low, and heat from the polygon motors 523, 524 and the like is diffused from the heat generation space SP1 to the cooling space SP2 and further can be efficiently released to the outside of the deflector 520.

Modified Examples (A) The image forming device 100 illustrated in FIGS. 1A to 1C is a color laser printer. The image forming device according to the embodiment of the present invention may be any one of a monochrome laser printer, an ink jet printer, a facsimile machine, a copy machine, a complex machine, and the like.

(B) The light source 510 illustrated in FIGS. 2A and 2B and FIGS. 3A to 3C includes the semiconductor laser 511. The light source may further include an LED instead of the semiconductor laser. The structures of the optical systems such as the polygon mirror 521, fθ lens 531, and the like illustrated in FIGS. 2A and 2B and FIGS. 3A to 3C are merely examples, and other structures may be applied. For example, the number of deflection surfaces of the polygon mirror may also be an integer value other than "7". The emission optical systems 512 to 514 or the scanning optical systems 531 to 535 may have a structure in which the one same group of the optical elements may be used in exposure scanning performed by two or more photoreceptor drums in a shared manner, instead of the structure in which the group of the optical elements is provided for each of the photoreceptor drums 24Y to 24K in one-to-one basis as illustrated in FIGS. 1A to 3C.

(C) The structure of the polygon motor illustrated in FIGS. 4C and 4D is a shaft fixing type, the polygon mirror 521 includes the bearing, and the shaft 522 is fixed to the bottom plate 525. The polygon motor may also be a shaft rotation type. In other words, the case body of the deflector may include a bearing, and the shaft may be coaxially fixed to the polygon mirror and can be rotatable therewith.

(D) The inner wall 600 illustrated in FIGS. 5A and 5B has an annular lateral cross section. However, the shape of the lateral cross section of the inner wall is not limited thereto. As far as turbulence can be prevented by stabilizing an air flow generated around the polygon mirror 521 by rotation thereof, the shape of the lateral cross section of the inner wall may be other perfect annular shapes such as an ellipse or a polygon or may also be an imperfect annular shape missing a part of the circumference, such as a C shape or a U shape.

(E) The inner wall 600 illustrated in FIGS. 5A and 5B includes the six wing-like surfaces 611 to 616 as the rectifier. These wing-like surfaces are arranged at equal intervals in the circumferential direction, and all thereof are thin plate shape and have the common length, width, thickness, and inclination angle θ with respect to the center axis CAX of the inner wall 600, and furthermore, the width, thickness, and the inclination angle θ are uniform in the entire length thereof. However, the number of the wing-like surfaces, arrangement, shape, size, and inclination angle thereof may be changed as far as a function as the rectifier, in other words, the function to guide an air flow generated by rotation of the polygon mirror 521 from one to the other of the heat generation space SP1 and the cooling space SP2 can be exerted. For example, the number of wing-like surfaces may be four as already used in the simulation illustrated in FIGS. 6A to 6D and FIGS. 7A to 7E. As far as it is possible to keep a sufficient flow rate of a descending component FAF from the cooling space SP2 to the heat generation space SP1 illustrated in FIGS. 6D and 7E, an upper end of a wing-like surface may be located at a position same as a lower end of an adjacent wing-like surface in the circumferential direction or may reach the ceiling 601 of the top cover in a manner different from the upper ends 617 illustrated in FIG. 6A. As far as it is possible to keep a flow rate of an ascending component RAF from the heat generation space SP1 to the cooling space SP2 illustrated in FIGS. 6C and 7D, a width, a thickness, or an inclination angle of a wing-like surface may be different in accordance with a circumferential position. For example, a large amount of circumferential flow rate may be secured by more narrowing a width of a wing-like surface or more increasing an inclination angle θ in the vicinity of the ceiling 601 or the motor substrate 605 than in the vicinity of the polygon mirror 521. In contrast, the gap between the inner surface of the inner wall 600 and the outer peripheral surface of the polygon mirror 521 may be further narrowed by narrowing a width of a wing-like surface in the vicinity of the trajectory TRJ of the outer peripheral surface of the polygon mirror 521. Furthermore, like the case where the lateral cross section of the inner wall has a C shape or a U shape, in a case where rotational symmetry around the center axis of the inner wall is lower than axis symmetry of the inner wall 600 illustrated in FIGS. 5A and 5B, the rotational symmetry of all of the wing-like surfaces may be lower than 6-fold symmetry illustrated in FIG. 6A so as to conform to this low rotational symmetry. In other words, the wing-like surfaces are at least required to be able to keep stable air flows circulating in the respective heat generation space SP1 and cooling space SP2 without breaking a rotationally symmetric shape of the air flows.

(F) The inner wall 600 and the wing-like surfaces 611 to 616 are integrally molded together with the top cover 526 from the same material. Besides, at least any one of the inner wall and the wing-like surfaces may be separately molded from the top cover 526. Even in this case also, both of the inner wall and the wing-like surface are preferably made of a metal having high heat conductivity, such as aluminum, or a resin in a manner similar to the material of the top cover 526.

(G) In any one of the wing-like surfaces 611 to 616 illustrated in FIGS. 5A to 7E, the inclined direction is equal to the rotational direction of the polygon mirror 521. However, this is not an essential point in the invention. As described below, as far as a wing-like surface can guide an air flow from one to the other of the heat generation space SP1 and the cooling space SP2 as the rectifier, an inclined direction may be opposite to the rotational direction of the polygon mirror 521, inclined directions may be opposite to each other between adjacent wing-like surfaces, or an inclined direction may be vertical to the rotation axis of the polygon mirror 521.

Case where Inclination Angle is Opposite to Rotational Direction of Polygon Mirror 521

Figure 8A:
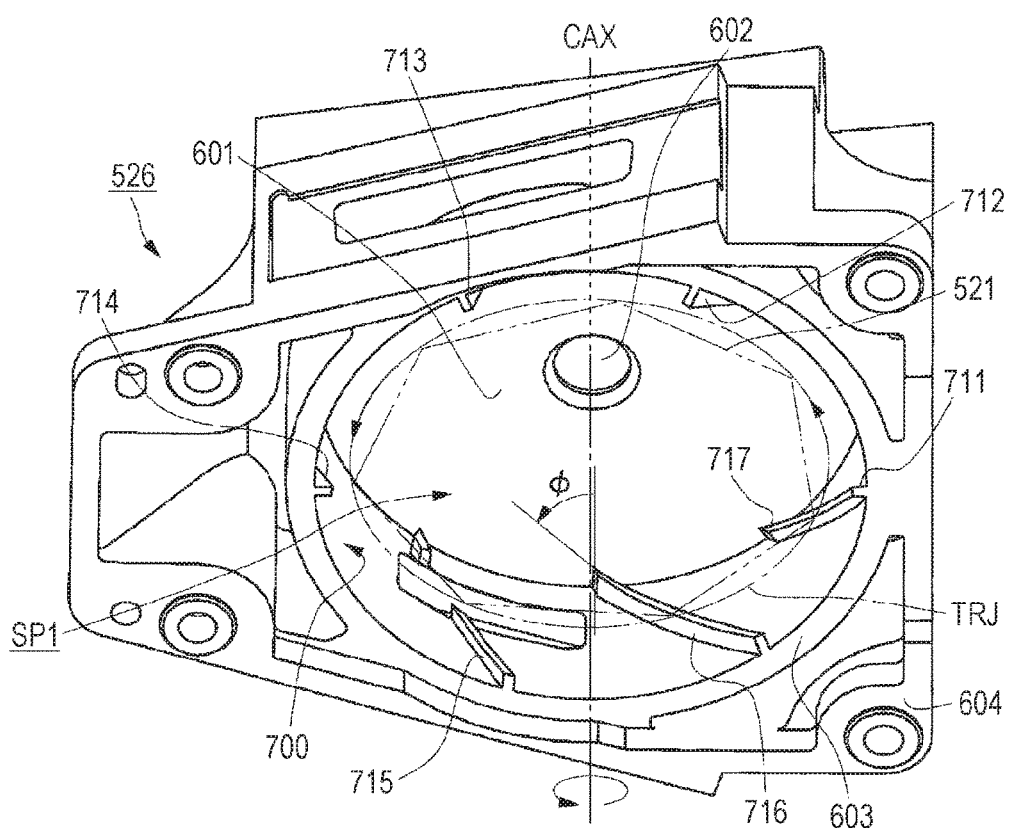
FIG. 8A is a perspective view illustrating an inner wall including a rectifier according to a first modified example.

FIG. 8A is a perspective view illustrating an inner wall 700 including a rectifier according to a first modified example. This inner wall 700 differs from the inner wall 600 illustrated in FIG. 5A only in having wing-like surfaces 711 to 716. In the following, these wing-like surfaces 711 to 716 will be described, and the description of the embodiment will be applied as for other common portions.

The rectifier according to the first modified example includes the six wing-like surfaces 711 to 716 illustrated in FIG. 8A. Similar to the wing-like surfaces 611 to 616 illustrated in FIG. 5B, shapes and arrangement of these wing-like surfaces 711 to 716 exhibit 6-fold rotational symmetry around the center axis CAX. However, different from the wing-like surfaces 611 to 616 illustrated in FIG. 5B, an inclined direction of these wing-like surfaces 711 to 716 are opposite to the rotational direction of the polygon mirror 521, that is, a counterclockwise direction in the view from the ceiling 601 side of the top cover 526. In this case also, as described below, these wing-like surfaces 711 to 716 each guide, from among the air flows circulating in the respective heat generation space SP1 and the cooling space SP2, a component moved from one to the other of the two spaces SP1 and SP2 without breaking respective axisymmetric shapes.

FIGS. 8B to 8D are diagrams illustrating distribution of directions and pressures of air flows in the sealed space obtained from simulation. Similar to FIGS. 6A to 6D, FIGS. 8B to 8D illustrate examples of having four wing-like surfaces 711 to 714. FIG. 8B is a diagram in a case of viewing, from the ceiling 601 side of the top cover 526, distribution in a plane traversing the heat generation space SP1 in a direction vertical to the axial direction (normal direction of a sheet surface in the drawing), and FIGS. 8C and 8D are diagrams in a case of viewing, from the outside of the inner wall 700, distribution in a vertical cross section of the sealed space taken along circular arcs c-c and d-d illustrated in FIG. 8B, respectively. Both of the arcs c-c and d-d are concentric with the trajectory TRJ of the outer peripheral surface of the polygon mirror 521 indicated by a dashed line in FIG. 8B, and have radii larger than that of the trajectory TRJ. FIGS. 8C and 8D further indicate a position in a lateral cross section of the heat generation space SP1 illustrated in FIG. 8B by a straight line b-b, and indicate a position of the polygon mirror 521 by a broken line. This lateral cross section of the heat generation space SP1 is closer to the motor substrate 605 on the bottom plate 525 than the lower surface of the polygon mirror 521.

In FIGS. 8B to 8D, a direction of a thin arrow (having a constant length) indicates a direction of an air flow, and pressures of air flows are indicated by regional patterns classified in eight levels. (The denser the pattern is, the higher the pressure is.

Although not illustrated in FIG. 8B, an air flow in the cooling space SP2 largely swirls around the center axis CAX on the inner side of the trajectory TRJ of the outer peripheral surface of the polygon mirror 521. Both of distribution of directions and distribution of pressures of the air flows are substantially axisymmetric. On the other hand, air flows include a high pressure region HPR below respective lower ends 717 of the wing-like surfaces 711 to 714 on the outer side of the trajectory TRJ of the outer peripheral surface of the polygon mirror 521. This is caused by the following reason. As illustrated in FIGS. 8C and 8D, in the heat cooling space SP2, an air flow collides with respective upper half portions 718 of the wing-like surfaces 711 to 714 and increases a pressure in the vicinity thereof. With this pressure increase, a component FAF descending from the cooling space SP2 to the heat generation space SP1 along the wing-like surfaces 711 to 714 is generated in this air flow. This descending component FAF collides with the motor substrate 605 below the respective lower ends 717 of the wing-like surfaces 711 to 714, and generates using the high pressure region HPR.

The air flows in the cooling space SP2 include a low pressure region LPR on the upper side thereof as illustrated in FIG. 8C because a flow rate flowing above the respective wing-like surfaces 711 to 714 is reduced by generation of the descending component FAF. In this low pressure region LPR, an air flow descends in an accelerated manner, and collides with an air flow in the heat generation space SP1. As a result, a relatively high pressure region RHR is generated at a boundary between the heat generation space SP1 and the cooling space SP2 in a range from above the respective upper ends 717 of the wing-like surfaces 711 to 714 to downstream sides thereof. In this region RHR, an air flow in the heat generation space SP1 intercrosses with an air flow in the cooling space SP2, and particularly, a component RAF ascending from the heat generation space SP1 to the cooling space SP2 is generated. With this component, the flow rate in the cooling space SP2 lost by the descending component FAF is compensated from the air flow in the heat generation space SP1.

Thus, the wing-like surfaces 711 to 714 guide, from among the air flows circulating in the respective heat generation space SP1 and cooling space SP2, the components RAF and FAF moved from one to the other of the two spaces SP1 and SP2. Since existence of these components RAF and FAF is limited on the outer side of the trajectory TRJ of the outer peripheral surface of the polygon mirror 521 and also is stationary, the air resistance caused by these components RAF and FAF and received by the polygon mirror 521 is sufficiently little. On the other hand, heat from the polygon motors 523, 524 and the like is diffused from the heat generation space SP1 to the cooling space SP2 by convection generated by these components RAF and FAF as described below.

FIGS. 9A to 9E are diagrams illustrating distribution of directions and temperatures of air flows in the sealed space obtained from simulation. Similar to FIGS. 8A to 8D, FIGS. 9A to 9E illustrate examples of having the four wing-like surfaces 711 to 714. Similar to FIG. 8B, FIG. 9A is a view in a case of viewing, from the ceiling 601 side of the top cover 526, distribution in the lateral cross section of the heat generation space SP1. FIGS. 9B and 9C are respectively distribution diagrams in the vertical cross sections of the enclosed space taken along diameters b-b and c-c illustrated in FIG. 9A. One diameter b-b thereof traverses the wing-like surfaces 712 and 714, and the other diameter c-c passes between the wing-like surfaces 711 and 712. FIGS. 9D and 9E are diagrams in a case of viewing, from the outside of the inner wall 700, distributions in the vertical cross section of the sealed space taken along arcs d-d and e-e illustrated in FIG. 9A, respectively. Both of the arcs d-d and e-e are concentric with the trajectory TRJ of the outer peripheral surface of the polygon mirror 521 indicated by a dashed line in FIG. 9A, and have radii larger than that of the trajectory TRJ. One arc d-d thereof vertically traverses an entire length of the wing-like surface 712, and the other arc e-e extends between the adjacent wing-like surfaces 713 and 714. FIGS. 9B to 9D indicate a position in the lateral cross section of the heat generation space SP1 illustrated in FIG. 9A by a straight line a-a, and FIGS. 9D and 9E indicate a position of the polygon mirror 521 by a broken line. This lateral cross section of the heat generation space SP1 is closer to the upper surface of the motor substrate 605 than the lower surface of the polygon mirror 521. In FIGS. 9A to 9E, a direction of a thin arrow (having a constant length) indicates a direction of an air flow, and temperatures of air flows are indicated by regional patterns classified in eight levels. (The denser the pattern is, the higher the temperature is.)

As illustrated in FIG. 9A, an air flow largely swirls around the center axis CAX in the circumferential direction in a direction same as rotation of the polygon mirror 521, namely, a clockwise direction. This is common in both of the heat generation space SP1 and the cooling space SP2. On the other hand, as illustrated in FIGS. 9B and 9C, an air flow largely circulate in each of the spaces SP1 and SP2 in the axial direction. More specifically, an air flow in the heat generation space SP1 is moved radially away from the center axis CAX in the vicinity of the lower surface of the polygon mirror 521, descends in the vicinity of the inner wall 700, is moved radially close to the center axis CAX in the vicinity of the upper surface 605 of the motor substrate, and ascends in the vicinity of the center axis CAX. An air flow in the cooling space SP2 is moved radially away from the center axis CAX in the vicinity of the upper surface of the polygon mirror 521, ascends in the vicinity of the inner wall 700, is moved radially close to the center axis CAX in the vicinity of the ceiling 601 of the top cover 526, and descends in the vicinity of the center axis CAX.

In addition to this global circulation, as illustrated in FIG. 9D, a component FAF descending from the cooling space SP2 to the heat generation space SP1 along each of the wing-like surfaces 711 to 714 exists on the outer side of the trajectory TRJ of the outer peripheral surface of the polygon mirror 521. Since this component FAF takes heat away from the periphery in the heat generation space SP1, a region LTR having a temperature lower than those in other regions in the heat generation space SP1 spreads in a range from above the respective lower ends 717 of the wing-like surfaces 711 to 714 to the vicinity and also the lower side thereof as illustrated in FIGS. 9C to 9E. As illustrated in FIG. 9C, the low temperature region LTR further extends toward the center axis CAX from between the wing-like surfaces 711 to 714 in the circumferential direction along the air flow circulating in the heat generation space SP1.

As illustrated in FIGS. 9C and 9E, a component RAF ascending from the heat generation space SP1 to the cooling space SP2 also exists between the adjacent wing-like surfaces 711 to 714 on the outer side of the trajectory TRJ of the outer peripheral surface of the polygon mirror 521. Since this component RAF carries heat from the heat generation space SP1 to the cooling space SP2, a region HTR having a temperature higher than those in other regions of the cooling space SP2 spreads above respective upper half portions 718 of the wing-like surfaces 711 to 714. The heat thus carried by the ascending component RAF from the heat generation space SP1 to the cooling space SP2 is further diffused toward the center axis CAX by the vortex around the center axis CAX. Due to this, the high temperature region HTR extends along a flow of the vortex toward the center axis CAX from above the respective wing-like surfaces 711 to 714 as illustrated in FIG. 9B.

Case where Adjacent Wing-Like Surface are Inclined in Opposite Directions

Figure 10:
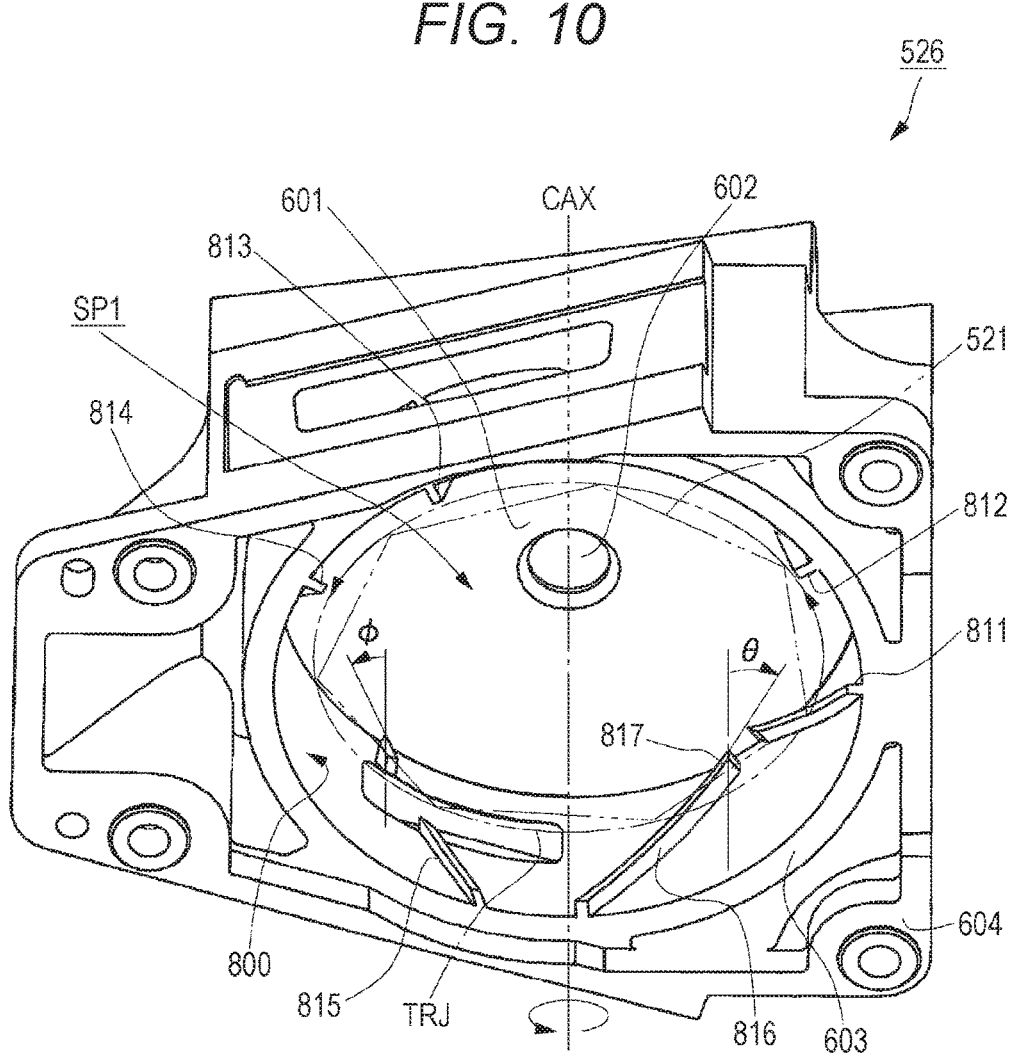
FIG. 10 is a perspective view illustrating an inner wall including a rectifier according to a second modified example.

FIG. 10 is a perspective view illustrating an inner wall 800 including a rectifier according to a second modified example. This inner wall 800 differs from the inner wall 600 illustrated in FIG. 5A only in having wing-like surfaces 811 to 816. In the following, these wing-like surfaces 811 to 816 will be described, and the description of the embodiment will be applied as for other common portions.

The rectifier according to the second modified example includes the six wing-like surfaces 811 to 816 illustrated in FIG. 10. These wing-like surfaces 811 to 816 differ from the wing-like surfaces 611 to 616 illustrated in FIG. 5B in that inclined directions are opposite between the adjacent wing-like surfaces. In other words, three first wing-like surfaces 811, 813, 815 each having an inclined direction same as the rotational direction of the polygon mirror 521 and three second wing-like surfaces 812, 814, 816 each having an inclined direction opposite thereto are arranged alternatively in the circumferential direction. Except for this point, a shape, a size, and an inclination angle θ are common in all of the wing-like surfaces 811 to 816, and the wing-like surfaces are arranged at equal intervals in the circumferential direction. Therefore, the shapes and arrangement of the wing-like surfaces 811 to 816 exhibit 3-fold rotational symmetry around the center axis CAX. In this case also, as described below, these wing-like surfaces 811 to 816 each guide, from among the air flows circulating in the respective heat generation space SP1 and cooling space SP2, a component moved from one to the other of the two spaces SP1 and SP2 without breaking respective axisymmetric shapes.

Figure 11A:
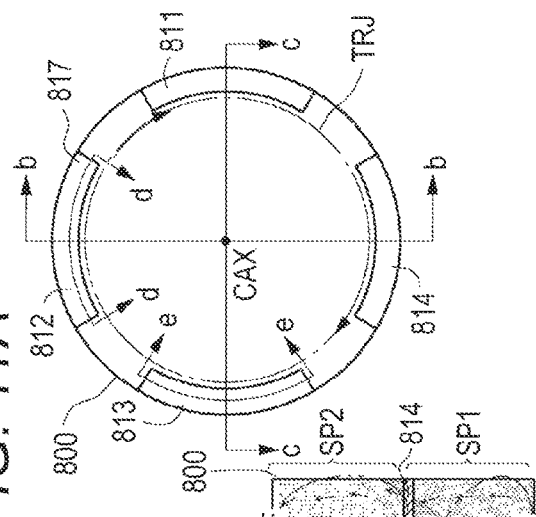
FIG. 11A is a schematic top view of the inner wall illustrated in FIG. 10.
Figure 11B:
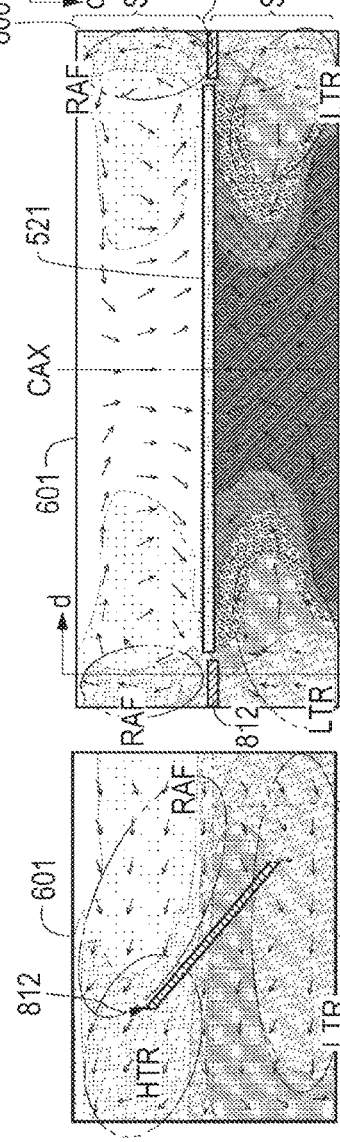
FIGS. 11B to 11E are diagrams illustrating distribution of directions and temperatures of air flows in a sealed space surrounded by the inner wall.
Figure 11D:
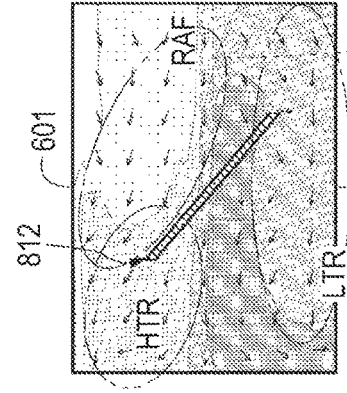
Figure 11E:
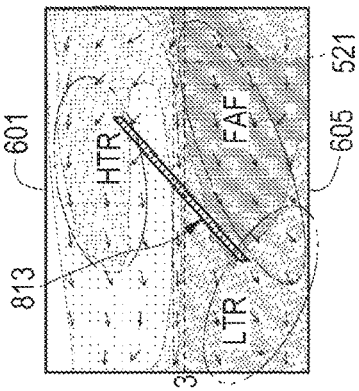
Figure 11C:
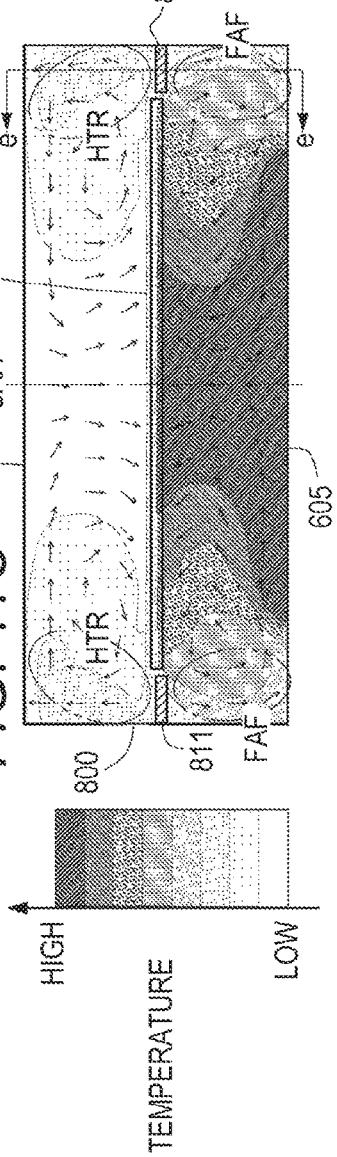

FIG. 11A is a schematic top view of the inner wall 800, and the ceiling 601 of the top cover 526 is illustrated in a transparent manner for convenience of description. FIGS. 11B to 11E are diagrams illustrating distribution of directions and temperatures of air flows in the sealed space obtained from simulation. FIGS. 11A to 11E illustrate examples of having four wing-like surfaces 811-814. FIGS. 11B and 11C are distribution diagrams in the vertical cross sections of the enclosed space taken along diameters b-b and c-c illustrated in FIG. 11A, respectively. One diameter b-b thereof traverses the second wing-like surfaces 812 and 814, and the other diameter c-c traverses the first wing-like surfaces 811 and 813. FIGS. 11D and 11E are diagrams in a case of viewing, from the outside of the inner wall 800, distribution in the vertical cross section of the sealed space taken along arcs d-d and e-e illustrated in FIG. 11A, respectively. Both of the arcs d-d and e-e are concentric with the trajectory TRJ of the outer peripheral surface of the polygon mirror 521 indicated by a dashed line in FIG. 11A, and have radii larger than that of the trajectory TRJ. One arc d-d thereof traverses an entire length of the second wing-like surface 812, and the other arc e-e traverses an entire length of the first wing-like surface 813. FIGS. 11D and 11E indicate a position of the polygon mirror 521 by a broken line. In FIGS. 11B to 11E, a direction of a thin arrow (having a constant length) indicates a direction of an air flow, and temperatures of air flows are indicated by regional patterns classified in eight levels. (The denser the pattern is, the higher the temperature is.)

An air flow largely swirls around the center axis CAX in the circumferential direction in a direction same as rotation of the polygon mirror 521, namely, a clockwise direction. This is common in both of the heat generation space SP1 and the cooling space SP2. On the other hand, as illustrated in FIGS. 11B and 11C, an air flow largely circulates in each of the spaces SP1 and SP2 in the axial direction. More specifically, an air flow in the heat generation space SP1 is moved radially away from the center axis CAX in the vicinity of the lower surface of the polygon mirror 521, descends in the vicinity of the inner wall 800, is moved radially close to the center axis CAX in the vicinity of the upper surface 605 of the motor substrate, and ascends in the vicinity of the center axis CAX. An air flow in the cooling space SP2 is moved radially away from the center axis CAX in the vicinity of the upper surface of the polygon mirror 521, ascends in the vicinity of the inner wall 800, is moved radially close to the center axis CAX in the vicinity of the ceiling 601, and descends in the vicinity of the center axis CAX.

In addition to this global circulation, as illustrated in FIGS. 11D and 11E, a component RAF ascending from the heat generation space SP1 to the cooling space SP2 along each of the first wing-like surfaces 811 and 813 and a component FAF descending from the cooling space SP2 to the heat generation space SP1 along each of the second wing-like surfaces 812 and 814 exist on the outer side of the trajectory TRJ of the outer circumferential surface of the polygon mirror 521. Since the ascending component RAF carries heat from the heat generation space SP1 to the cooling space SP2, a high temperature region HTR spreads above upper half portions 818 of the first wing-like surfaces 811 and 813. As illustrated in FIG. 11C, this high temperature region HTR further extends toward the center axis CAX from above the first wing-like surfaces 811 and 813 along the vortex around the center axis CAX. On the other hand, since the descending component FAF takes heat away from the periphery of the heat generation space SP1, the low temperature region LTR as illustrated in FIGS. 11B and 11D spreads from above respective lower ends 817 of the second wing-like surfaces 812 and 814 to the vicinity and also the lower side thereof. This low temperature region LTR further sneaks below the second wing-like surfaces 812 and 814 along a circumferential air flow as illustrated in FIG. 11D, and extends toward the center axis CAX from below the second wing-like surfaces 812 and 814 along the air flow circulating in the heat generation space SP1 as illustrated in FIG. 11B.

Case Where Wing-Like Surface is Vertical to Rotation Axis of Polygon Mirror

Figure 12A:
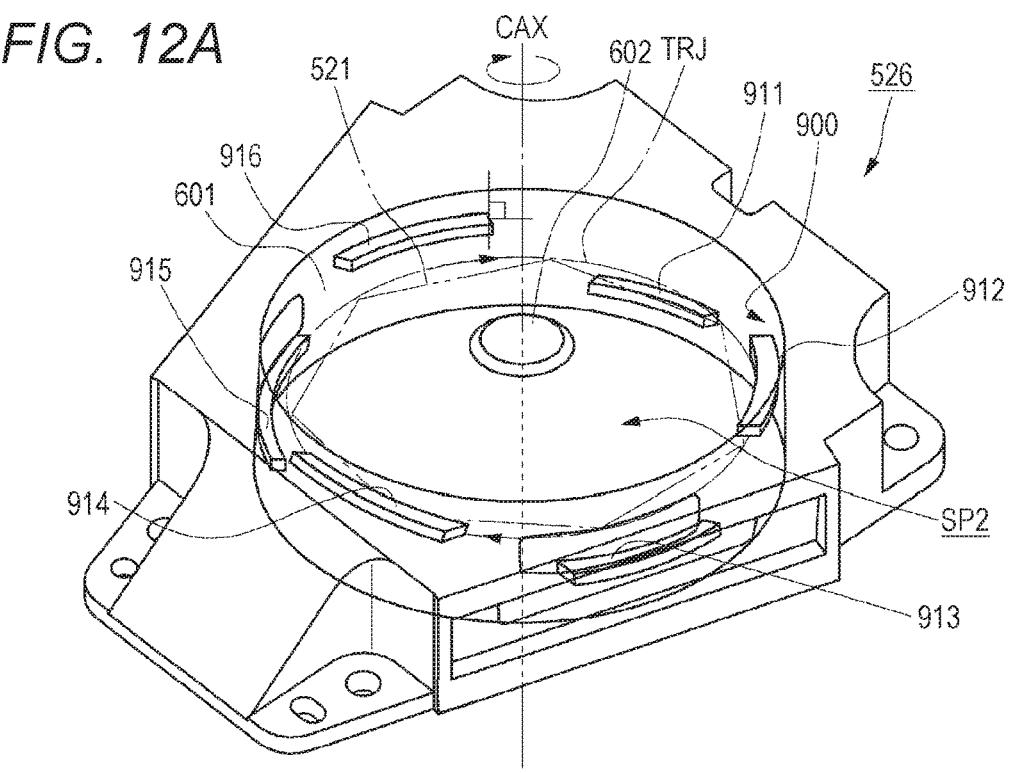
FIGS. 12A and 12B are perspective views of an inner wall including a rectifier according to a third modified example from different viewpoints.
Figure 12B:
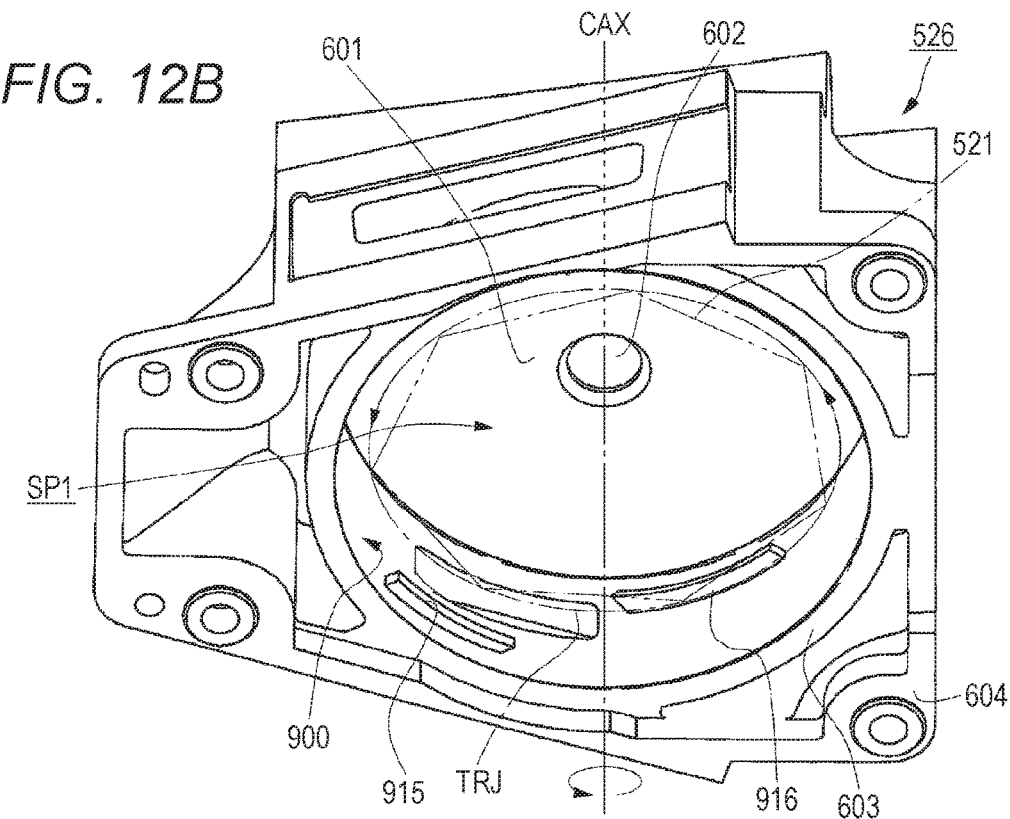

FIGS. 12A and 12B are perspective views illustrating an inner wall 900 of the top cover 526 of the deflector 520 from different viewpoints. The outer surface of the top cover 526 is viewed in FIG. 12A, and the inner surface thereof is viewed in FIG. 12B. In FIG. 12A, the top cover 526 is illustrated in a transparent manner and the heat radiation member 529 illustrated in FIG. 4A is removed for convenience of description. This inner wall 900 includes a rectifier according to a third modified example and differs from the inner wall 600 illustrated in FIG. 5A only in having wing-like surfaces 911 to 916. In the following, these wing-like surfaces 911 to 916 will be described, and the description of the embodiment will be applied as for other common portions.

The rectifier according to the third modified example includes the six wing-like surfaces 911 to 916 illustrated in FIGS. 12A and 12B. These wing-like surfaces 911 to 916 are different from the wing-like surfaces 611 to 616 illustrated in FIG. 5B, and a longitudinal direction thereof is vertical to the rotation axis of the polygon mirror 521, namely, a center axis CAX of the inner wall 900. Furthermore, an axial position is different between the wing-like surfaces adjacent in the circumferential direction, and when one is located on the motor substrate 605 side with respect to the polygon mirror 521, the other is located on the opposite side thereof, namely, the ceiling 601 side of the top cover 526. In other words, the three first wing-like surfaces 911, 913, 915 located in the heat generation space SP1 and the three second wing-like surfaces 912, 914, 916 located in the cooling space SP2 are alternately arranged in the circumferential direction. Additionally, since the wing-like surfaces 911 to 916 each have a width larger than a distance between the trajectory TRJ of the outer circumferential surface of the polygon mirror 521 and an inner surface of the inner wall 900, edges (upstream ends) 917 of the wing-like surfaces 911 to 916 are close to the center axis CAX than the trajectory TRJ. In other words, the outer peripheral surface of the polygon mirror 521 passes through a region vertically sandwiched by the first wing-like surfaces 911, 913, 915 and the second wing-like surfaces 912, 914, 916. Except for these points, a shape and a size are common in all of the wing-like surfaces 911 to 916, and the wing-like surfaces are arranged at equal intervals in the circumferential direction. Therefore, the shapes and arrangement of these wing-like surfaces 911 to 916 exhibit 3-fold rotational symmetry around the center axis CAX. In this case also, as described below, these wing-like surfaces 911 to 916 each guide, from among the air flows circulating in the respective heat generation space SP1 and cooling space SP2, a component moved from one to the other of the two spaces SP1 and SP2 without breaking respective axisymmetric shapes.

Figures 13A, 13B, 13C, 13D, 13E:
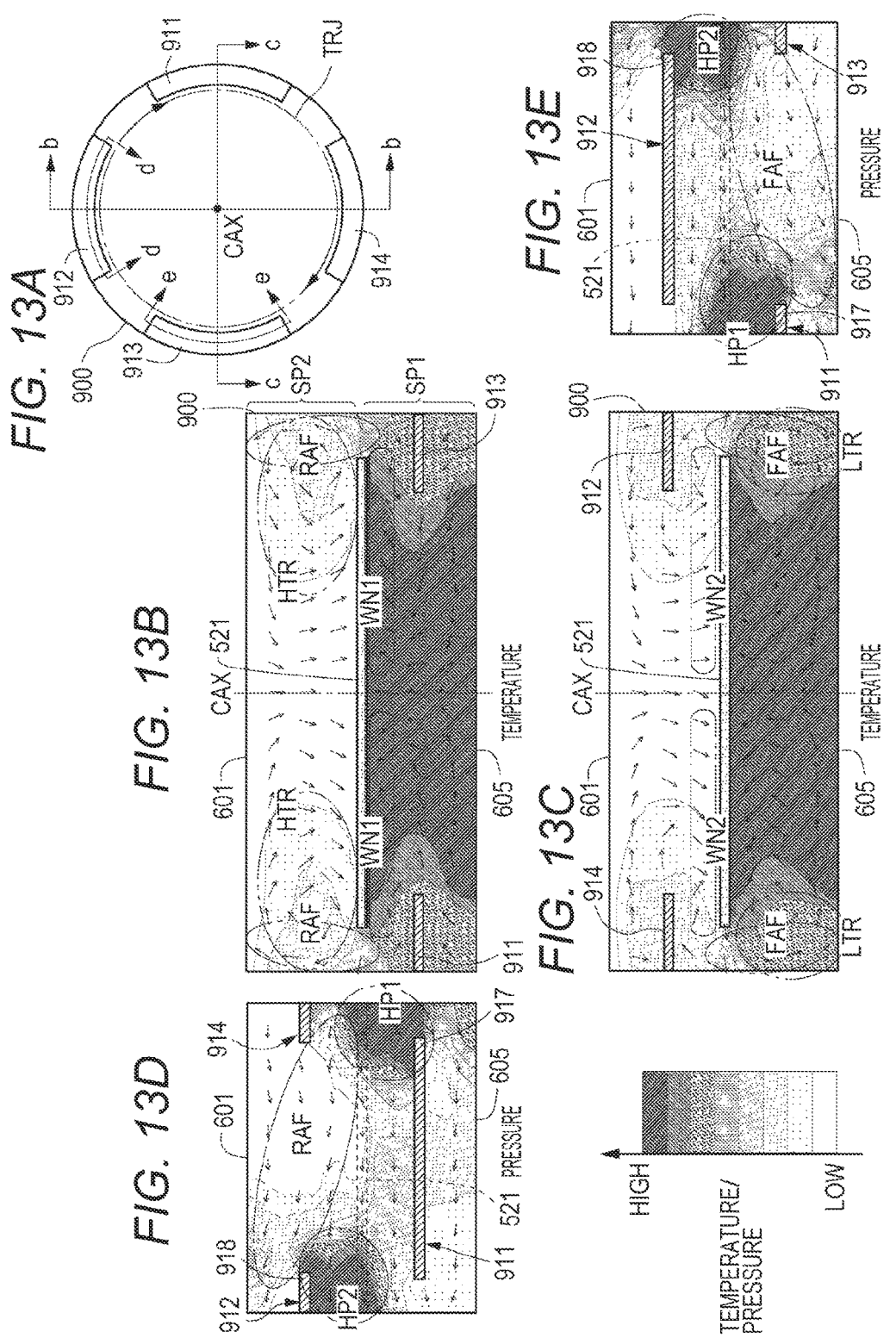

FIG. 13A is a schematic top view of the inner wall 900, and the ceiling 601 of the top cover 526 is illustrated in a transparent manner for convenience of description. FIGS. 13B and 13C are vertical cross-sectional views of the sealed space, illustrating distribution of directions and temperatures of air flows obtained from simulation, and FIGS. 13D and 13E are vertical cross-sectional views of the sealed space, illustrating distribution of directions and pressures of air flows obtained from simulation. FIGS. 13A to 13E illustrate examples of having four wing-like surfaces 911 to 914. In FIG. 13A, positions in the vertical cross sections illustrated in FIG. 13B and FIG. 13C are represented by diameters b-b and c-c respectively, and positions in the vertical cross sections illustrated in FIGS. 13D and E are represented by arcs d-d and e-e respectively. One diameter b-b thereof traverses the second wing-like surfaces 912 and 914, and the other diameter c-c traverses the first wing-like surfaces 911 and 913. Both of the arcs d-d and e-e are concentric with the trajectory TRJ of the outer peripheral surface of the polygon mirror 521 indicated by a dashed line in FIG. 13A, and have radii larger than that of the trajectory TRJ. One arc d-d thereof traverses an entire length of the second wing-like surface 912, and the other arc e-e traverses an entire length of the first wing-like surface 913. In FIGS. 13B to 13E, a direction of a thin arrow (having a constant length) indicates a direction of an air flow. In FIGS. 13B and 13C, temperatures of air flows are indicated by regional patterns classified in eight levels. (The denser the pattern is, the higher the temperature is.) FIGS. 13D and 13E indicate a position of the polygon mirror 521 by a broken line, and indicate pressures of air flows by regional patterns classified in eight levels. (The denser the pattern is, the higher the pressure is.

An air flow largely swirls around the center axis CAX in the circumferential direction in a direction same as rotation of the polygon mirror 521, namely, a clockwise direction. This is common in both of the heat generation space SP1 and the cooling space SP2. On the other hand, an air flow largely circulates in each of the spaces SP1 and SP2 in the axial direction as illustrated in FIGS. 13B and 13C. More specifically, an air flow in the heat generation space SP1 is moved radially away from the center axis CAX in the vicinity of the lower surface of the polygon mirror 521, descends between the first wing-like surfaces 911 and 913 in the vicinity of the inner wall 900 as illustrated in FIG. 13B, is moved radially close to the center axis CAX in the vicinity of the upper surface 605 of the motor substrate, and ascends in the vicinity of the center axis CAX. An air flow in the cooling space SP2 is moved radially away from the center axis CAX in the vicinity of the upper surface of the polygon mirror 521, ascends between the second wing-like surfaces 912 and 914 in the vicinity of the inner wall 900 as illustrated in FIG. 13C, is moved radially close to the center axis CAX in the vicinity of the ceiling 601, and descends in the vicinity of the center axis CAX.

In addition to this global circulation, a component RAF ascending from the heat generation space SP1 to the cooling space SP2 and a component FAF descending from the cooling space SP2 to the heat generation space SP1 exist on the outer side of the trajectory TRJ of the outer peripheral surface of the polygon mirror 521. This is caused by the following reason.

As illustrated in FIG. 13B, a component WN1 that is moved toward the outer peripheral surface from the center axis CAX along the lower surface of the polygon mirror 521 in a radial direction and swirls in the rotational direction of the polygon mirror 521 in the circumferential direction exists in an air flow in the heat generation space SP1. When this component WN1 reaches the inner surface of the inner wall 900 and descends, the component WN1 partly collides with the upstream end 917 of the first wing-like surface 911 and a high pressure region HP1 is generated in the vicinity of the upstream end 917 as illustrated in FIGS. 13D and 13E. In this high pressure region HP1, an air flow in the heat generation space SP1 intercrosses with an air flow in the cooling space SP2. As a result, as illustrated in FIG. 13D, a component RAF ascending from a lower side of the second wing-like surface 914 on the upstream side, particularly, from the heat generation space SP1 toward a side higher than the second wing-like surface 912 on the downstream side, that is, toward the cooling space SP2 is generated in an air flow moved between the second wing-like surfaces 914 and 912 in the circumferential direction.

As illustrated in FIG. 13C, a component WN2 that is moved toward the outer peripheral surface from the center axis CAX along the upper surface of the polygon mirror 521 in a radial direction and swirls in the rotational direction of the polygon mirror 521 in the circumferential direction exists in an air flow in the heat generation space SP2. When this component WN2 reaches the inner surface of the inner wall 900 and ascends, the component WN2 partly collides with an upstream end 918 of the second wing-like surface 912 and a high pressure region HP2 is generated in the vicinity of the upstream end 918 as illustrated in FIGS. 13D and 13E. In this high pressure region HP2, an air flow in the cooling space SP2 intercrosses with an air flow in the heat generation space SP1. As a result, as illustrated in FIG. 13E, a component FAF descending from an upper side of the first wing-like surface 913 on the upstream side, particularly, from the cooling space SP2 toward a side lower than the first wing-like surface 911 on the downstream side, namely, toward the heat generation space SP1 is generated in an air flow moved between the first wing-like surfaces 913 and 911 in the circumferential direction.

Thus, the wing-like surfaces 911 to 914 guide, from among air flows circulating in the respective heat generation space SP1 and cooling space SP2, the components RAF and FAF moved from one to the other of the two spaces SP1 and SP2. Since existence of these components RAF and FAF is limited on the outer side of the trajectory TRJ of the outer peripheral surface of the polygon mirror 521 and also is stationary, the air resistance caused by these components RAF and FAF and received by the polygon mirror 521 is sufficiently little. On the other hand, heat from the polygon motors 523, 524 and the like is diffused from the heat generation space SP1 to the cooling space SP2 by convection generated by these components RAF and FAF as described below. More specifically, since the ascending component RAF carries heat from the heat generation space SP1 to the cooling space SP2, a high temperature region HTR spreads inside the cooling space SP2 at an upper side of the outer periphery of the polygon mirror 521 as illustrated in FIGS. 13B and 13C. The high temperature region HTR further extends toward the center axis CAX by a circulation flow inside the cooling space SP2. On the other hand, since the descending component FAF takes heat away from the periphery of the heat generation space SP1, a low temperature region LTR spreads inside the heat generation space SP1 at a lower side of the outer periphery of the polygon mirror 521 as illustrated in FIGS. 13B and 13C. This low temperature region LTR further extends toward the center axis CAX by a circulation flow inside the heat generation space SP1.

As described above, in all of the modified examples, an ascending component RAF diffuses heat of the polygon motors 523, 524 and the like from the heat generation space SP1 to the cooling space SP2 and a descending component FAF cools the heat generation space SP1. As a result, an excessive temperature increase in the heat generation space SP1 caused by excessive accumulation of heat from the polygon motors and the like is prevented, and therefore, malfunction caused by overheat of the polygon mirror 521, the polygon motors 523, 524, and the like is prevented.

(H) The rectifier provided on the inner surface of the inner wall 600 illustrated in FIGS. 5A and 5B includes the six wing-like surfaces 611 to 616. The shape of the rectifier is not limited to these wing-like surfaces but can be any shape as far as the shape can guide, from among the air flows circulating in the respective heat generation space SP1 and cooling space SP2, a component moved from one to the other of the two spaces SP1 and SP2. For example, the rectifier may be a groove obliquely extending on the inner surface of the inner wall with respect to the rotation axis of the polygon mirror in a range from one side of the heat generation space and the cooling space to the other side thereof.

Figure 14:
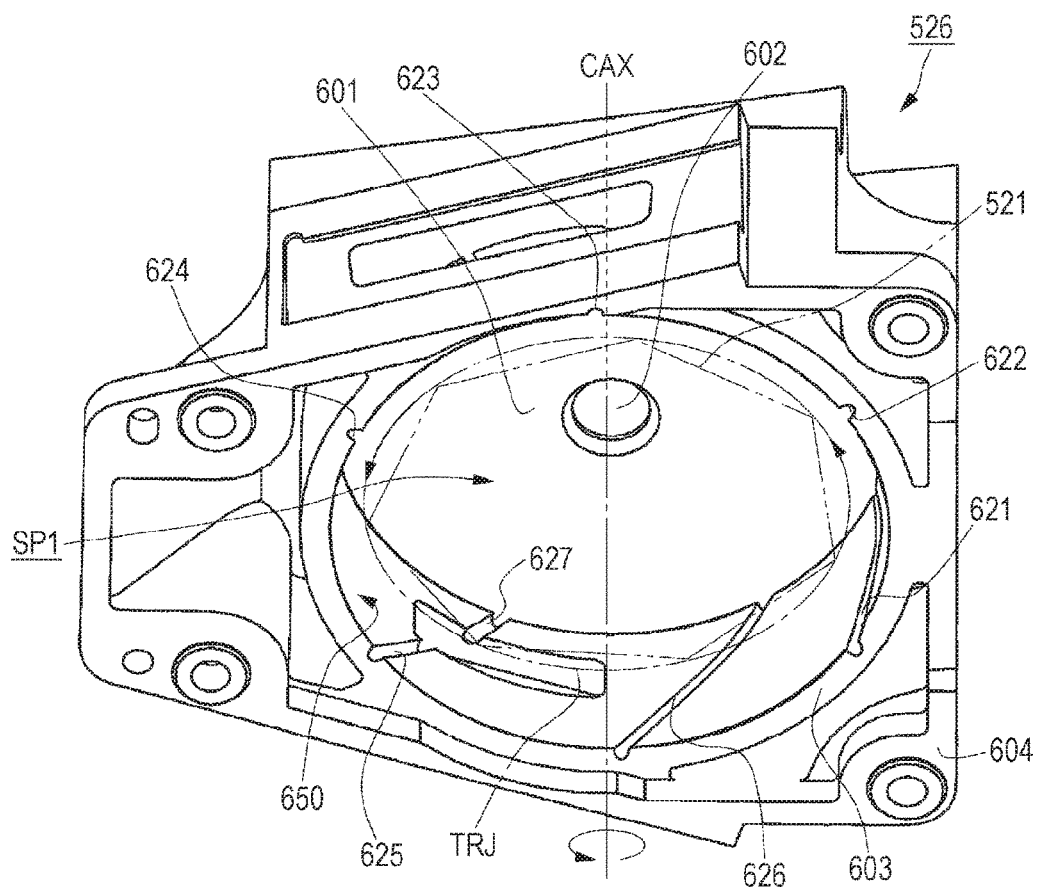
FIG. 14 is a perspective view illustrating an inner wall including six oblique grooves as a rectifier.

FIG. 14 is a perspective view illustrating an inner wall 650 including six oblique grooves 621 to 626 as a rectifier. This inner wall 650 differs from the inner wall 600 illustrated in FIG. 5A only in including the oblique grooves 621 to 626 instead of the wing-like surfaces 611 to 616. In the following, these oblique grooves 621 to 626 will be described, and the description of the embodiment will be applied as for other common portions.

The oblique grooves 621 to 626 are thin long grooves formed at portions located at equal intervals in an inner surface of the inner wall 650 in the circumferential direction, and respectively extend obliquely with respect to the rotation axis of the polygon mirror 521 from the lower end of the inner wall 600 along the inner surface thereof, namely, the center axis CAX of the inner wall 600. As illustrated in FIG. 14, the wing-like surfaces are spaced apart in the circumferential direction. Each one of the oblique grooves 621 to 626 is a semicircular groove, and particularly, a width, a depth, and an inclination angle θ (0°<θ<90°) with respect to the center axis CAX are uniform in an entire length thereof. The length, width, depth, and inclination angle θ are common in the oblique grooves 621 to 626. The common length extends from the heat generation space SP1 to the cooling space SP2, and all of upper ends 627 are located at the ceiling 601 of the top cover 526. A common inclined direction is the same as the rotational direction of the polygon mirror 521, that is, clockwise in the view from the ceiling 601 side. Thus, the shapes and arrangement of the oblique grooves 621 to 626 exhibit 6-fold rotational symmetry around the center axis CAX. As a result, similar to the wing-like surfaces 611 to 616 illustrated in FIGS. 5A and 5B, these oblique grooves 621 to 626 each guide, from among the air flows circulating in the respective heat generation space SP1 and cooling space SP2, a component flowing from one to the other of the two spaces SP1 and SP2 without breaking respective axisymmetric shapes. Actually, in the heat generation space SP1, there is high possibility in which an air flow moved in the circumferential direction more outside the trajectory TRJ of the outer peripheral surface of the polygon mirror 521 partly enters into the oblique grooves 621 to 626 and ascends from the heat generation space SP1 to the cooling space SP2 along the oblique grooves. Such an ascending air flow may generate pressure distribution as illustrated in FIGS. 6B to 6D on the outer side of the trajectory TRJ of the outer peripheral surface of the polygon mirror 521 in a manner similar to the ascending component RAF generated by the wing-like surfaces 611 to 616 illustrated in FIGS. 5A to 5B. Therefore, similar to the wing-like surfaces 611 to 616, the oblique grooves 621 to 626 may be able to provide, in the sealed space, the temperature distribution illustrated in FIGS. 7A to 7E. On the other hand, since an ascending air flow along each of the oblique grooves 621 to 626 and a descending air flow accompanied therewith are limited on the outer side of the trajectory TRJ of the outer peripheral surface of the polygon mirror 521 and also are stationary, air resistance caused by these air flows and received by the polygon mirror 521 is sufficiently little.

Meanwhile, the number of oblique grooves, arrangement, shape, size, and inclination angle thereof can be changed in a manner similar to the wing-like surfaces as far as the function as the rectifier, that is, the function to guide an air flow generated by rotation of the polygon mirror 521 from one to the other of the heat generation space SP1 and the cooling space SP2 can be exerted. For example, an oblique groove may be shorter than the oblique grooves 621 to 626 illustrated in FIG. 14 as far as the oblique groove keeps a sufficient flow rate of an ascending component from the heating space SP1 to the cooling space SP2. An oblique groove may have a width, a depth, a sectional shape, or an inclination angle that may be changed in accordance with a position in the circumferential direction. Besides a case where the inclined direction of an oblique groove is equal to the rotational direction of the polygon mirror 521 illustrated in FIG. 14, the inclined direction may be opposite to the rotational direction thereof or may be opposite between adjacent oblique grooves. Furthermore, in a case where rotational symmetry around the center axis of the inner wall is lower than axis symmetry, rotational symmetry of all of oblique grooves may be lower than 6-fold symmetry illustrated in FIG. 14 in accordance this low rotational symmetry. In other words, the oblique grooves are at least required to be able to stably keep air flows circulating in the respective heat generation space SP1 and cooling space SP2 without breaking a rotationally symmetric shape of the air flows.

The present invention relates to the optical scanning device and includes the rectifier on the inner surface of the inner wall 600 surrounding the outer periphery of the polygon mirror 521 inside the case body (including bottom plate 525 and top cover 526) of the deflector 520. The rectifier includes the wing-like surfaces 611 to 616 or the oblique grooves 621 to 626 which guide an air flow caused by rotation of the polygon mirror 521 from one to the other of the heat generation space SP1 and the cooling space SP2. Thus, the present invention is apparently industrially applicable.

Although embodiments of the present invention have been described and illustrated in detail, the disclosed embodiments are made for purposes of illustration and example only and not limitation. The scope of the present invention should be interpreted by terms of the appended claims.

What is claimed is:

1. An optical scanning device that scans a target surface with light, comprising:
    a light source;
    a deflector that deflects light of the light source; and
    an optical system that forms, on the target surface, an image of light deflected by the deflector,
    wherein the deflector includes:
        a polygon mirror that reflects and deflects light of the light source while being rotated;
        a motor that rotates the polygon mirror; and
        a case body that airtightly houses the polygon mirror and the motor,
    the case body includes a cylindrical inner wall surrounding an outer periphery of the polygon mirror, and
    the inner wall includes, on an inner surface, a rectifier that guides, from one to the other of a first space and a second space, an air flow generated by rotation of the polygon mirror in a space surrounded by the inner wall so that overheating of the polygon mirror is prevented and a risk of turbulence around the polygon mirror is minimized, and the first space is located on the motor side with respect to the polygon mirror and the second space is located on an opposite side of the first space.

2. The optical scanning device according to claim 1, wherein the rectifier includes at least one wing-like surface that radially projects from the inner surface of the inner wall and obliquely extends toward a rotation axis of the polygon mirror in a range from the first space to the second space.

3. The optical scanning device according to claim 2, wherein the rectifier includes at least two wing-like surfaces, and the wing-like surfaces are spaced apart in the circumferential direction.

4. The optical scanning device according to claim 2, wherein the rectifier includes at least two wing-like surfaces, and two wing-like surfaces adjacent in the circumferential direction have inclined directions opposing to each other with respect to the rotation axis of the polygon mirror.

5. The optical scanning device according to claim 1, wherein the rectifier includes, on the inner surface of the inner wall, at least one oblique groove that obliquely extends from one to the other of the first space and the second space with respect to the rotation axis of the polygon mirror.

6. The optical scanning device according to claim 5, wherein the rectifier includes at least two oblique grooves, and the oblique grooves are spaced apart in the circumferential direction.

7. The optical scanning device according to claim 5, wherein the rectifier includes at least two oblique grooves, and two oblique grooves adjacent in the circumferential direction have inclined directions opposing to each other with respect to the rotation axis of the polygon mirror.

8. The optical scanning device according to claim 1, wherein the rectifier includes:
    a first wing-like surface that radially projects from a portion included in the inner surface of the inner wall and facing the first space, and extends in the circumferential direction; and
    a second wing-like surface that radially projects from a portion included in the inner surface of the inner wall and facing the second space, and extends in the circumferential direction, and
    a range of the first wing-like surface differs from a range of the second wing-like surface in the circumferential direction.

9. The optical scanning device according to claim 8, wherein a distance between the range of the first wing-like surface and the range of the second wing-like surface are spaced apart in a circumferential direction.

10. The optical scanning device according to claim 1, wherein the inner wall and the rectifier have thermal conductivity as high as thermal conductivity of the case body.

11. The optical scanning device according to claim 1, further comprising
    a housing that houses the light source, the deflector, and the optical system,
    wherein the housing surrounds a space around the deflector to separate the space from the optical system, and includes a duct that guides external air to the space.

12. An image forming device comprising:
an image former that forms a toner image on a sheet; and
a fixer that thermally fixes the toner image,
wherein the image former includes:
- a photoreceptor in which a charge amount is changed in accordance with an exposure amount;
- the optical scanning device according to claim 1, which forms an electrostatic latent image on the photoreceptor by exposure scanning;
- a developer that develops the electrostatic latent image with a toner; and
- a transferor that transfers, from the photoreceptor to a sheet, a toner image developed by the developer.

\* \* \* \* \*